(12) United States Patent
Hayashi

(10) Patent No.: US 6,406,199 B1
(45) Date of Patent: Jun. 18, 2002

(54) PRINTING CONTROL APPARATUS AND METHOD

(75) Inventor: Eiji Hayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/151,350

(22) Filed: Sep. 10, 1998

(30) Foreign Application Priority Data

Sep. 11, 1997 (JP) .............................................. 9-247213

(51) Int. Cl.⁷ ................................................ B41J 11/44
(52) U.S. Cl. ........................ 400/76; 358/1.12; 358/449; 358/488; 270/58.09
(58) Field of Search .............................. 400/76; 399/81, 399/82, 83, 402, 403, 404, 407, 408, 410, 701, 49; 270/58.08, 58.09, 58.1, 58.11, 58.12, 58.13; 358/1.12, 449, 488

(56) References Cited

U.S. PATENT DOCUMENTS

| | | | |
|---|---|---|---|
| 4,672,462 A | | 6/1987 | Yamada ........................ 358/280 |
| 4,754,303 A | | 6/1988 | Ito ............................. 355/14 R |
| 4,878,656 A | | 11/1989 | Honjo et al. ................... 270/56 |
| 4,965,629 A | * | 10/1990 | Hiroi et al. ................... 399/410 |
| 5,053,831 A | * | 10/1991 | Ishiguro et al. ............... 399/70 |
| 5,113,222 A | * | 5/1992 | Wilson et al. ................. 399/81 |
| 5,343,304 A | | 8/1994 | Nakai et al. ................... 358/296 |
| 5,422,743 A | * | 6/1995 | Farrell et al. ................. 358/537 |
| 5,461,459 A | * | 10/1995 | Muramatsu ................... 358/448 |
| 5,508,798 A | * | 4/1996 | Yamada ..................... 270/58.09 |
| 5,602,651 A | * | 2/1997 | Tabata et al. .................. 399/45 |
| 5,619,635 A | | 4/1997 | Millman et al. |
| 5,627,650 A | * | 5/1997 | Nosaki et al. ................. 399/408 |
| 5,678,135 A | * | 10/1997 | Fukui et al. ................... 399/81 |
| 5,722,031 A | * | 2/1998 | Fujii et al. .................... 399/410 |
| 5,731,879 A | * | 3/1998 | Maniwa ....................... 358/401 |
| 5,749,040 A | * | 5/1998 | Muramatsu ................... 399/410 |
| 5,771,103 A | * | 6/1998 | Ogino ......................... 399/410 |
| 5,774,232 A | * | 6/1998 | Tabata et al. ................. 358/448 |
| 5,774,758 A | * | 6/1998 | Takahashi et al. ........... 399/408 |
| 6,027,107 A | * | 2/2000 | Natsume et al ............... 270/37 |
| 6,029,026 A | * | 2/2000 | Natsume et al. .............. 399/82 |
| 6,115,510 A | * | 9/2000 | Koga ......................... 399/408 |
| 6,173,088 B1 | * | 1/2001 | Koh et al. .................... 358/488 |
| 6,205,452 B1 | * | 3/2001 | Warmus et al. .............. 707/500 |
| 6,314,213 B1 | * | 11/2001 | Miyahara et al. ........... 358/1.11 |
| 6,330,067 B1 | * | 12/2001 | Murata ....................... 358/1.12 |

FOREIGN PATENT DOCUMENTS

EP 0 505 968 9/1992

OTHER PUBLICATIONS

European Search Report dated Feb. 4, 2000 (Ref. IM/2601230).

* cited by examiner

*Primary Examiner*—Eugene Eickholt
(74) *Attorney, Agent, or Firm*—Fitzpatrick, Cella, Harper & Scinto

(57) ABSTRACT

A printer having a stapling function is controlled. If the size of a sheet of paper to be printed on is set when the user designates a stapling position, positions at which stapling is possible are decided in dependence upon the set paper size and these positions are displayed as candidates for selection. The user selects a desired position from among the candidates. The selected position is displayed together with an image of the paper shape indicating the page layout of the paper, the orientation of print data and stapling orientation. Lastly, the candidates for selection are displayed on the image. The stapling position thus set is sent to the printer when printing is performed.

67 Claims, 25 Drawing Sheets

FIG. 9

| INFORMATION | DETAILS | SHARED | MAIN | PAPER | LAYOUT | DEVICE OPTIONS |

OVERLAY | PAPER DISCHARGE | PageComposer

PRINTED SIDE: ⦿ SINGLE-SIDED (N)  ○ DOUBLED-SIDED (R)

STAPLING ORIENTATION:
⦿ LONG EDGE LEFT/TOP (1)
○ SHORT EDGE TOP/RIGHT (3)
○ LONG EDGE RIGHT/BOTTOM (2)
○ SHORT EDGE BOTTOM/LEFT (4)

BINDING MARGIN (T): 0 mm

RETURN TO STANDARD (D)

OK | CANCEL | UPDATE (A) | HELP

FIG. 10

```
INFORMATION | DETAILS | SHARED | MAIN | PAPER | PAPER LAYOUT | DEVICE OPTIONS
        OVERLAY     |   PAPER DISCHARGE    |   PageComposer
```

☑ STAPLING STACKER INSTALLED (F) — 1002

PAPER DISCHARGE PORT (H): [AUTOMATIC ▼]

PAPER FEED METHOD:
○ NO DESIGNATION (N)    ○ JOB OFFSET (O)
⦿ STAPLING (S) — 1003

PAPER TO BE STAPLED (P): [A4 ▼] — 1006

```
┌─────────────────┐
│①               ③│
│  ABCDEFGHIJK    │
│  LMNOPQR        │ ⑤
│  STUVWXYZABC    │
│  DEFGH          │
│  IJKLMNOPQR     │
│  STUVWXYZ       │
│④               ⑧│
│        ⑥        │
└─────────────────┘
```
1004a
1004

PRINT DATA
1007 — ORIENTATION: [A ⦿PORTRAIT (T)  [A ○LANDSCAPE (Y)

STAPLING POSITION:
⦿ POSITION (1)   ○ POSITION2 (2)   ○ POSITION3 (3)   ○ POSITION4 (4)
○ POSITION5 (5)  ○ POSITION6 (6)   ○ POSITION7 (7)   ○ POSITION8 (8)
1005

☐ USE JOB SPOOLING FUNCTION (J)

[ OK ]   [ CANCEL ]   [ UPDATE (A) ]   [ RETURN TO STANDARD (D) ]   [ HELP ]

POSITION TO BE STAPLED :

⦿ POSITION1 ( 1 )   ○ POSITION2 ( 2 )   ○ POSITION3 ( 3 )   ○ POSITION4 ( 4 )
○ POSITION5 ( 5 )   ○ POSITION6 ( 6 )   ○ POSITION7 ( 7 )   ○ POSITION8 ( 8 )

FIG. 12B

POSITION TO BE STAPLED :

⦿ POSITION1 ( 1 )   ○ POSITION2 ( 2 )   ○ POSITION3 ( 3 )   ○ POSITION4 ( 4 )
○ POSITION5 ( 5 )   ○ POSITION6 ( 6 )   ○ POSITION7 ( 7 )   ○ POSITION8 ( 8 )

FIG. 12C

POSITION TO BE STAPLED :

⦿ POSITION1 ( 1 )   ○ POSITION2 ( 2 )   ○ POSITION3 ( 3 )   ○ POSITION4 ( 4 )
○ POSITION5 ( 5 )   ○ POSITION6 ( 6 )   ○ POSITION7 ( 7 )   ○ POSITION8 ( 8 )

FIG. 23

| NUMBER OF HOLES | PITCH |
|---|---|
| 2 HOLES · 4 HOLES | 80mm ○ ○ |
| 3 HOLES | 108mm ○ |
| 4 HOLES | 70mm ○ ○ |
| 4 HOLES | 57mm ○ ○ ○ |
| 22 HOLES | (12.7mm PITCH) ---- ○ ○ |
| 26 HOLES · 30 HOLES | (9.5mm PITCH) ---- ○ ○ |

PRINTING CONTROL APPARATUS AND METHOD

BACKGROUND OF THE INVENTION

This invention relates to a printing control apparatus and method for controlling a device such as a printing device having a binding function for binding together a plurality of sheets of output paper output by the device.

A system in which printing is performed using a computer conventionally includes a function according to which the printer in such a system outputs a specified number of copies of the printed document. A copier has a stapling function for binding together the printout on a per-copy basis in order to eliminate the labor involved in gathering the printout together copy by copy when a plurality of copies have been made, as well as the labor involved in binding the copies together.

However, the state of the art is such that a printing device for printing print data from a host computer or the like does not possess such a stapling function. If a stapling function is added onto a printing device utilized by a host computer, therefore, the host computer will be incapable of supporting the stapling function. This makes it necessary for the host computer to be able to control the stapling function.

SUMMARY OF THE INVENTION

Accordingly, an object of the present invention is to provide a printing control apparatus and method whereby a printing device having a binding function can be controlled and excellent operability assured.

According to the present invention, the foregoing object is attained by providing a printing control apparatus for controlling a printing device having a function for binding paper output by the printing device, comprising size setting means for setting paper size, display means for deciding, in dependence upon the set paper size, positions at which binding can be performed, and displaying these positions as candidates, selecting means for selecting a desired position from the candidates displayed, and transmitting means for transmitting the position selected by the selecting means to the printing device as a binding position.

Further, the foregoing object is attained by providing a printing control method for controlling a printing device having a function for stapling paper output by the printing device, comprising a size setting step of setting paper size, a display step of deciding, in dependence upon the set paper size, positions at which binding can be performed, and displaying these positions as candidates, a selecting step of selecting a desired position from the candidates displayed, and a transmitting step of transmitting the position selected at the selecting step to the printing device.

Further, the foregoing object is attained by providing a computer readable storage medium storing a computer program in accordance with which printing is performed by a printing device having a function for binding paper output by the printing device, comprising size setting processing code for setting paper size, display processing code for deciding, in dependence upon the set paper size, positions at which binding can be performed, and displaying these positions as candidates, selecting processing code for selecting a desired position from the candidates displayed, and transmitting processing code for transmitting the position selected by the selecting processing to the printing device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a diagram showing a layout setting screen;

FIG. 10 is a diagram showing a stapling setting screen;

FIGS. 12A–12C are diagrams showing part of the stapling setting screen, particularly stapling position radio buttons;

FIG. 23 is a diagram showing a table of available number/pitch of holes.

DESCRIPTION OF THE PREFERRED EMBODIMENTS

A printing system will be described as an embodiment of the present invention. The system includes a printer, which has a stapling stacker for binding printouts together on a per-copy basis and retaining the printouts in a stack, and a host computer that uses the printer.

<Configuration of Printing System>

Figure 1:
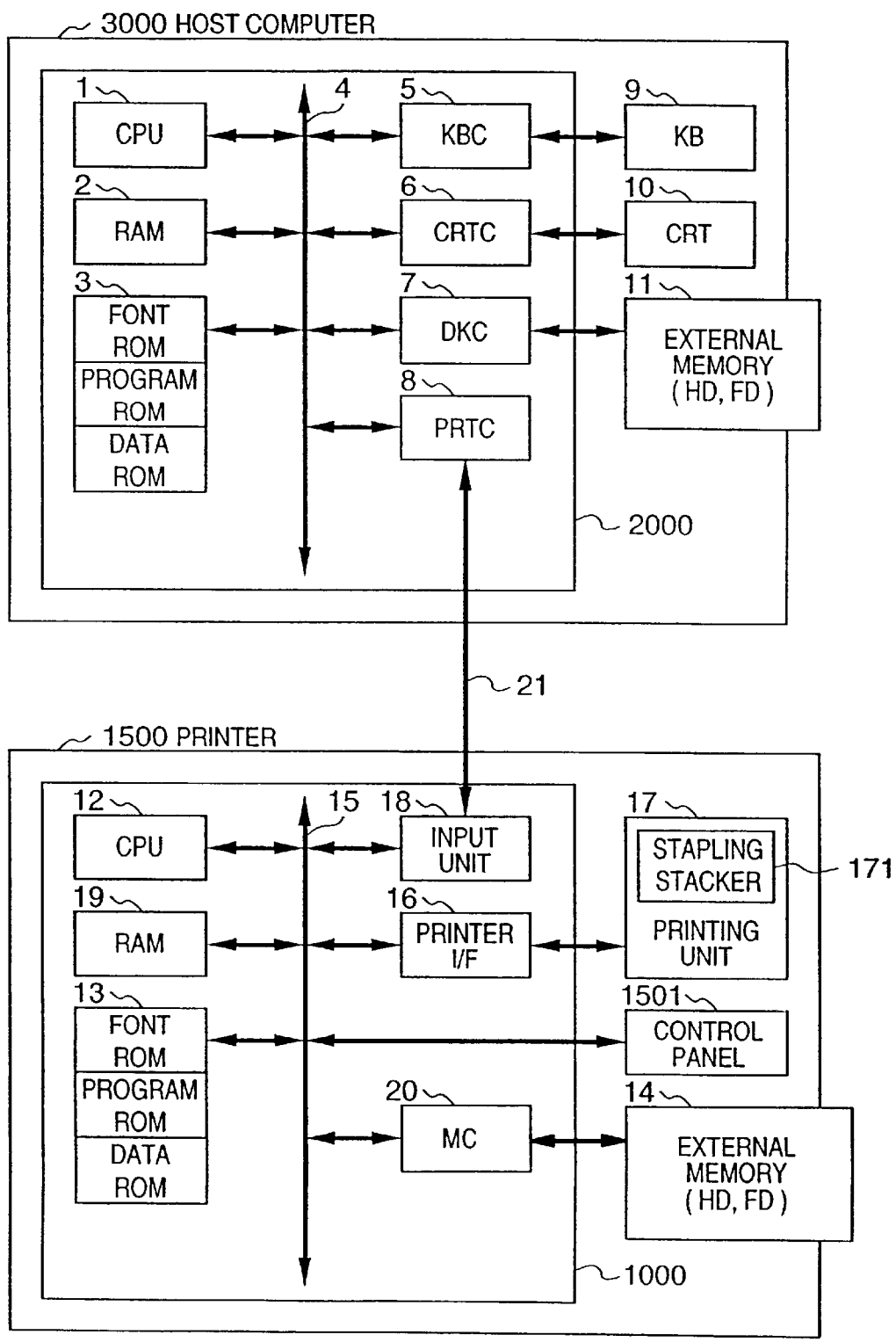
FIG. 1 is a block diagram of a printing system comprising a host computer and a printer.

FIG. 1 is a block diagram of a printing system comprising a host computer 3000 and a printer 1500. The host computer 3000 has a CPU 1 which, on the basis of a document processing program that has been stored in the program ROM of a ROM 3, executes the document processing of a document containing a mixture of graphics, images, characters and tables (inclusive of spreadsheets, etc.). The CPU 1 performs overall control of various devices connected to a system bus 4. A RAM 2 functions as the main memory and work area of the CPU 1. A keyboard controller (KBC) 5 controls inputs from a keyboard 9 and pointing device, which is not shown. A CRT controller (CRTC) 6 controls the display on a CRT display 10. A screen for setting a printer, described later, also is displayed on the CRT 10. A disk controller (DKC) 7 controls access to an external memory 11, such as a hard disk (HD) or floppy disk (FD), which stores a booting program, various applications, font data, user files and edited files, etc. A printer controller (PRTC) 8, which is connected to a printer 1500 via a bidirectional interface 21, executes processing for controlling communication with the printer 1500. The CPU 1 executes processing to rasterize outline fonts in a display information RAM, provided in, say, the RAM 2, and makes possible implementation of a WYSIWYG (What You See I What You Get) function using the CRT 10. Further, the CPU 1, besides executing a program for implementing the flowchart of a procedure, described later, opens various windows that have been registered and executes a variety of data processing on the basis of commands designated by a mouse cursor (not shown) on the CRT 10.

The printer 1500 has a CPU 12 which, on the basis of a control program stored in a program ROM of a ROM 13, outputs an image signal, which serves as output information, to a printing unit (printer engine) 17 connected printing unit interface (I/F) 16. The printing unit 17 includes a stapling stacker 171 in addition to a mechanism for performing printer. Though the stapling stacker 171 is separate from the printer, it is shown as being part of the printing unit 17 because it operates in cooperation with the printing unit.

The CPU 12, which can execute processing for communicating with the host computer via a bidirectional interface (I/F) 21, is adapted so as to be capable of notifying the host computer 3000 of information internal to the printer. A RAM 19 functions as the main memory and work area of the CPU 12. An input unit 18 controls communication of status information such as printing status information with the host computer 3000 via the bidirectional interface 21 and is capable of notifying the host computer 3000 of information internal to the printer. A memory controller (MC) 20 controls access to an external memory 14 such as a hard disk (HD) or floppy disk (FD) which stores a booting program, various applications, font data, user files and edited files, etc. A control panel 1501, which includes a display panel and keyboard, supplies information to the operator and inputs commands from the operator.

<Printer Mechanism>

Figure 17:
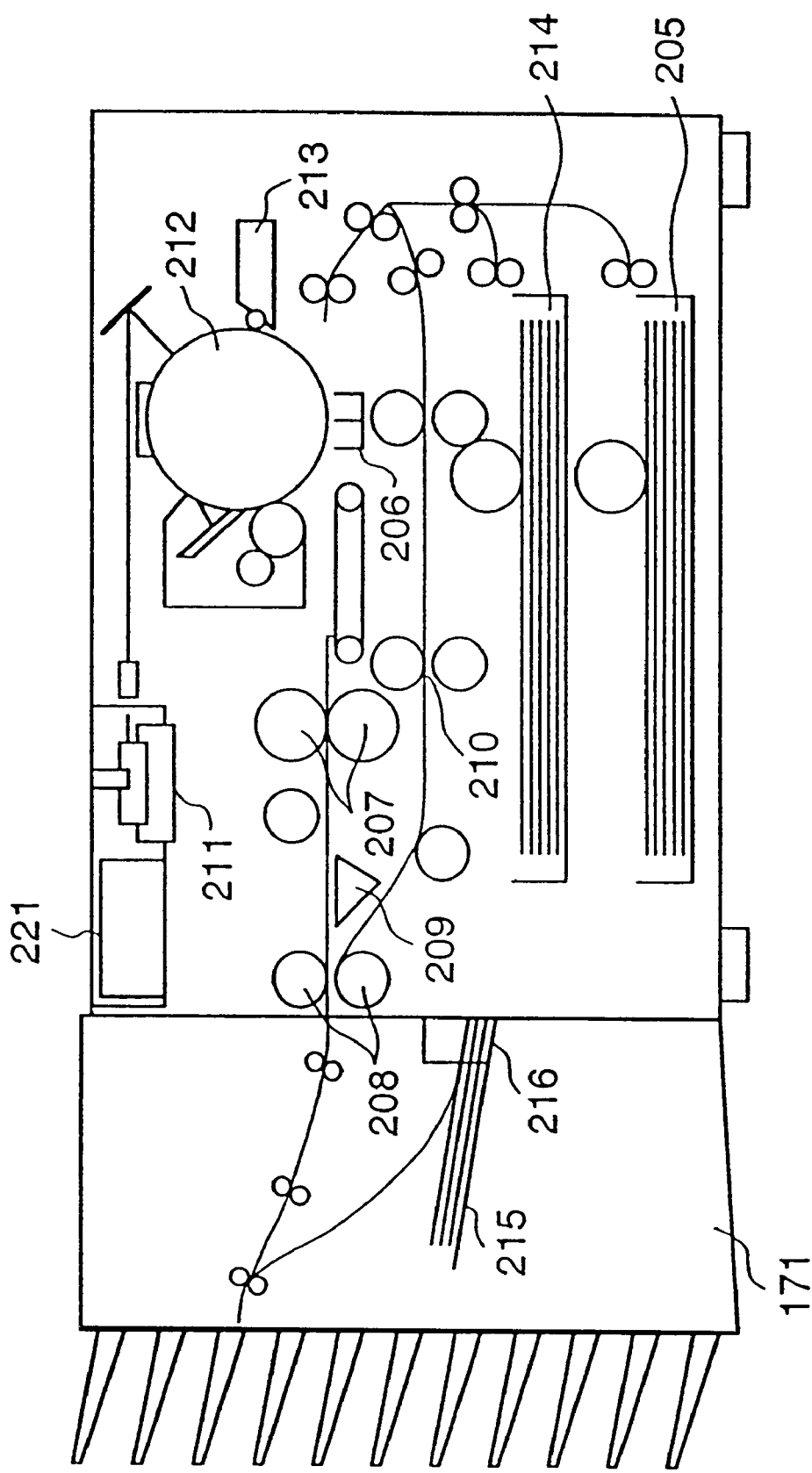
FIG. 17 is a sectional view of a printer and shows the principal components of a mechanism of a printing unit.

FIG. 17 is a sectional view of the printer 1500 and shows the principal components of a mechanism of the printing unit 17. A laser driver 221 drives a laser emission unit 211, whereby the latter is caused to emit a laser beam that conforms to image data received from the host computer 3000. The laser beam illuminates a photosensitive drum 212 so that a latent image conforming to the laser beam is formed on the drum. A developing agent is applied to the latent image on the photosensitive drum 212 by a developing device 213. A sheet of recording paper is supplied from a cassette 214 or cassette 205 and transported to transfer unit 206 at a timing synchronized to the start of illumination by the laser beam, whereby the developing agent affixed to the photosensitive drum 212 is transferred to the recording paper. The sheet of recording paper carrying the developing agent is transported to a fixing unit 207, which proceeds to fix the developing agent to the recording paper by the application of heat and pressure. The sheet of recording paper that has passed through the fixing unit 207 is discharged by discharge rollers 208, and the stapling stacker 171 staples a prescribed number of discharged sheets of recording paper together and places the stapled sheets in respective bins to assort the recording paper. If stapling processing is executed, recording paper that has been introduced to the stapling stacker 171 is placed on a stapling table 215 without being discharged from the printer. When a prescribed number of sheets have accumulated, the sheets of recording paper are stapled together by a stapling unit 216. The stapling position, therefore, is limited to the trailing edge of the paper with regard to the transport direction and, because of the mechanism involved, is limited to both ends of this edge and to a location between these ends.

If sorting has not been set, the recording paper is received by the uppermost bin. If double-sided printing has been set, the recording paper is transported to the discharge rollers 208, after which the discharge rollers 208 are rotated in the reverse direction so that the recording paper is introduced to the paper transport path again by a flapper 209. If multiple printing has been set, the recording paper is introduced to the paper transport path again by a flapper 209 so as not to be transported to the discharge rollers 208. Recording paper that has been introduced to the paper transport path again is supplied to the transfer unit 206 at the above-mentioned timing.

<Software structure of host computer>

Figure 2:
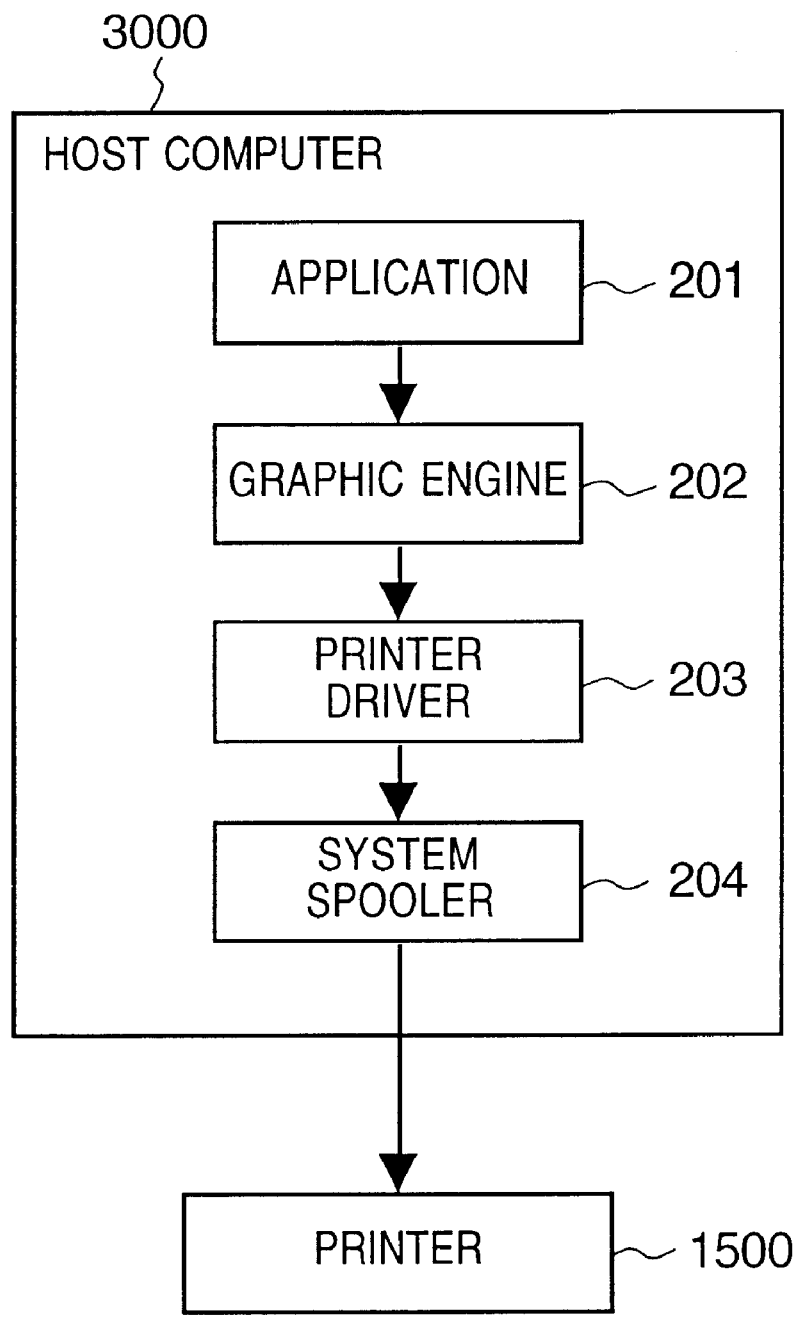
FIG. 2 is a diagram showing the structure of printing software in a host computer.

The structure of the software in accordance with which the host computer 3000 performs printing in this system is as shown in FIG. 2. Specifically, print data generated by an application 201 is delivered to a graphics engine 202, which is part of the operating system, in response to a print request from the application. The graphics engine 202 utilizes a printer driver 203 specific to the printer 1500 to generate print data suited to the printer 1500. The printer driver 203 delivers the generated data to a system spooler 204. The latter spools the print data and sends the print data to the printer in accordance with the printer schedule. The printer driver at this time transmits information for controlling the stapling stacker to the printer 1500 together with the print data based upon a stapling setting through a procedure that will be described later.

Figure 3:
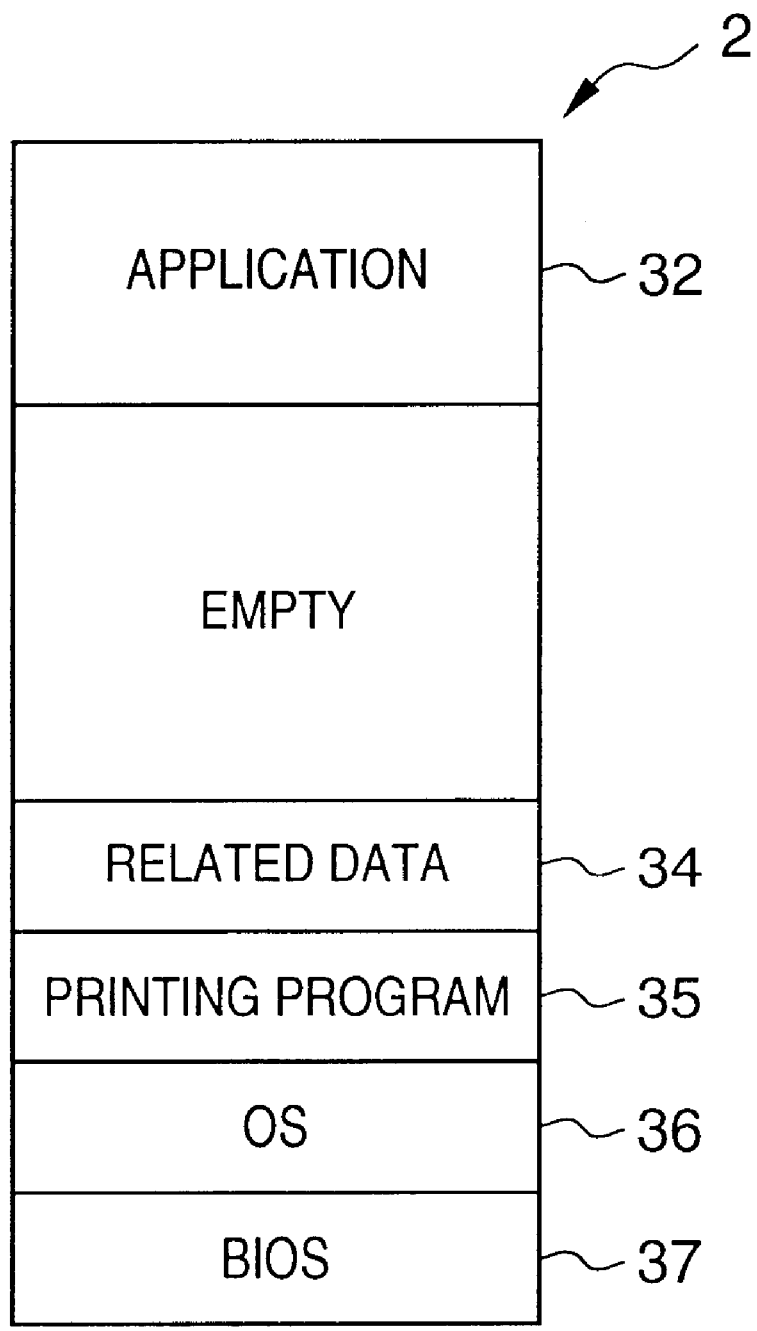
FIG. 3 is a diagram of a memory map when printing is performed by the host computer or when the printer is set.

FIG. 3 shows an example of a memory map of the RAM 2 when printing is performed by the host computer 1500 or when the printer is set. An application 32 performs printing using an operating system (OS) 36 and a printing program (printer driver) 35. A basic input/output interface (BIOS) 37 includes a program for driving a parallel interface or serial interface, etc., connected to the printer 1500. Related data 34 includes setting information relating to settings for printing, such as paper size and layout information, as well as setting information relating to a stapling function, described later, used upon being set by the printer driver.

A procedure for setting stapling in order to utilize the stapling function will be described with reference to the flowcharts of FIGS. 4 through 7 and the examples of displays shown in FIGS. 8 through 14.

<Procedure for Setting Stapling and Displaying Set Content>

The user configures printing processing in dependence upon the printer used. One example is to configure printing processing in such a manner that when the user calls printer setting provided by the operating system or the like, a printer driver is called from the operating system, a screen for deciding setting information specific to the printer is displayed and setting is performed on the display screen. Setting is performed in accordance with this method in the present embodiment.

FIG. 10 is an example of a screen for printer set-up when printer set-up has been called by the user. In this example, information, details, paper, layout and paper discharge, etc., are decided for each setting, and the user selects the screen in dependence upon the information to be set. FIG. 10 shows an example in which a "PAPER DISCHARGE" screen 1001 has been selected from the above. The user utilizes a pointing device such as a mouse or a keyboard to set such items as the paper discharge port and stapling position on this display screen, thereby setting stapling.

Figure 4:
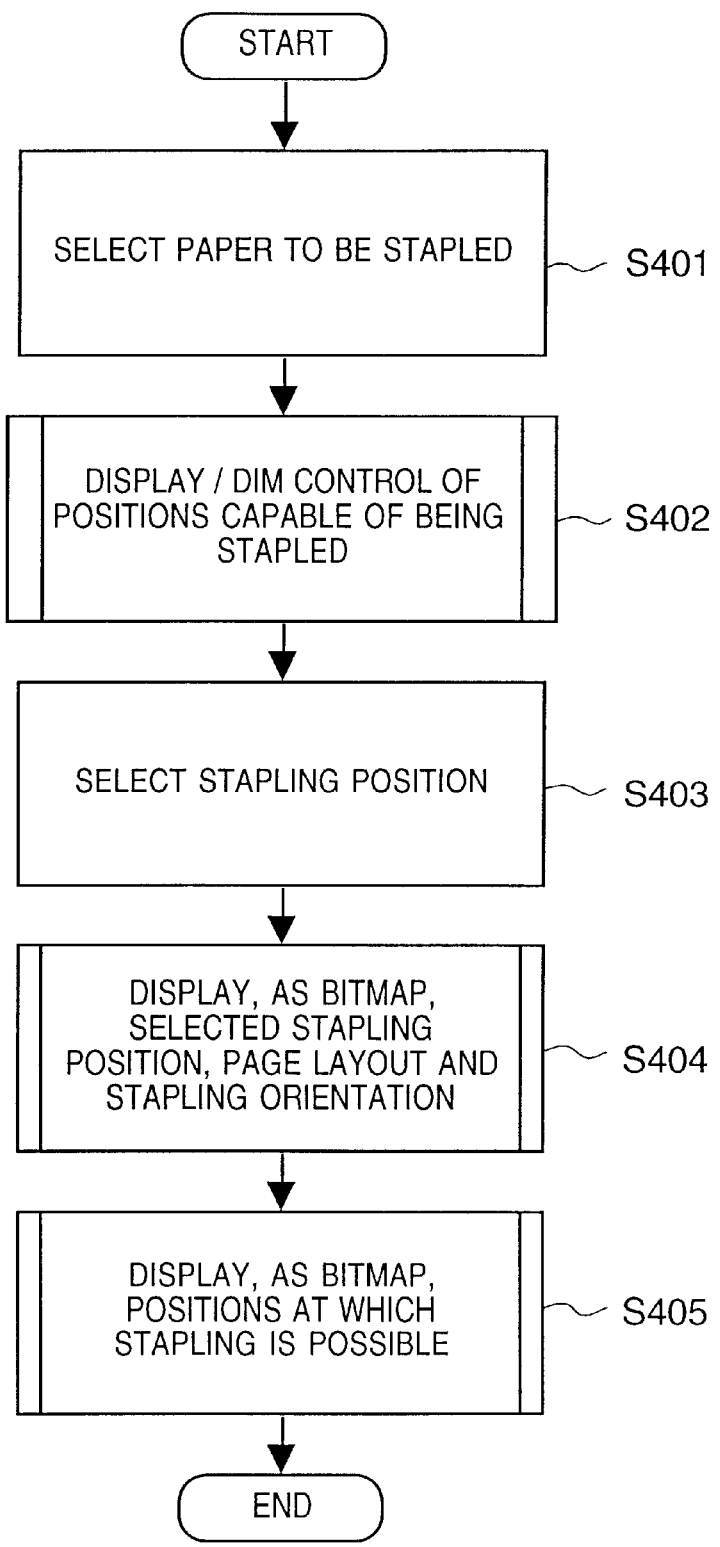
FIG. 4 is a flowchart showing a procedure for setting stapling on a screen.

FIG. 4 is a flowchart of a procedure for setting stapling on the display screen of FIG. 10. Here the operation for setting stapling is premised on installation of the stapling stacker 171. If a "STAPLING STACKER INSTALLED" box 1002 and a "STAPLING" box 1003 have not been checked, therefore, no display is presented in a bitmap display window 1004 and stapling cannot be set. More specifically, the procedure of FIG. 4 is executed when the printing setting screen is called and the "PAPER DISCHARGE" setting is selected from the screen on the assumption that the "STAPLING STACKER INSTALLED" box 1002 and a "STAPLING" box 1003 have been checked. Alternatively, the procedure is executed when the "PAPER DISCHARGE" setting is selected and the "STAPLING" box 1003 is checked.

Figure 11A:
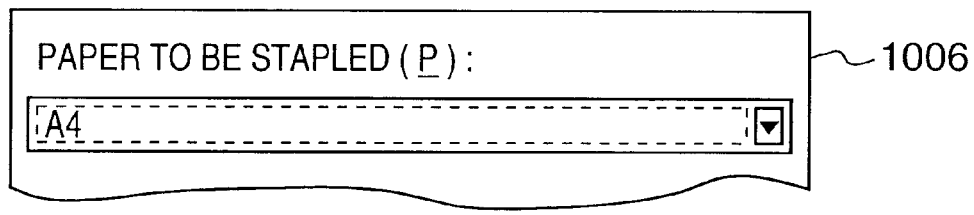
FIG. 11A is diagram showing a text box for setting paper that is to be stapled.

First, paper size is set in a "PAPER TO BE STAPLED" text box 1006 at step S401. FIG. 11A shows the text box 1006 in the highlighted state. This indicates that a setting has been made in the text box 1006. The size of the paper to be stapled is specified as being size A4 in FIGS. 10 and 11A. The specified size is stored in the RAM 2 as related data.

Figure 11B:
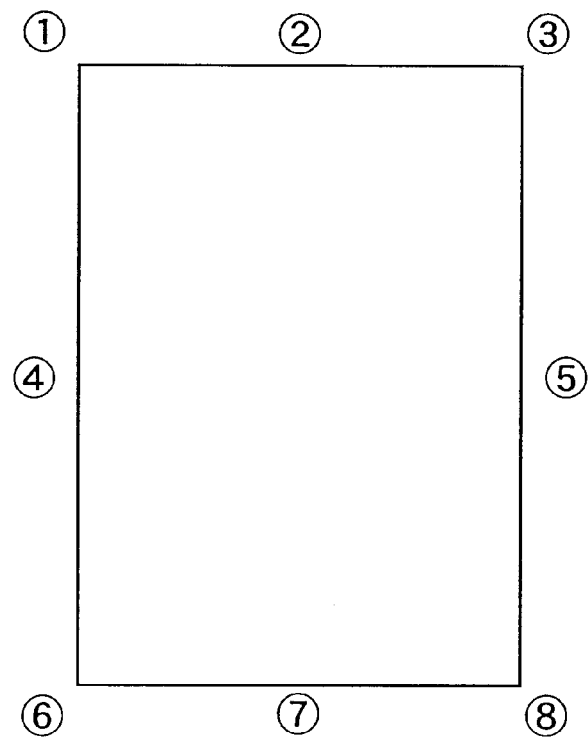
FIG. 11B is a diagram exemplifying numerals representing stapling positions.

Positions at which stapling can and cannot be performed, which are decided by the designated paper size, are displayed in a "STAPLING POSITION" area 1005 in FIG. 10 at step S402. The stapling unit 216 can perform stapling at any of three locations at one edge of the paper, namely at both ends of one edge and at a position between both ends. Accordingly, candidates for positions at which stapling is possible are corners (1), (3), (6) and (8) of the paper and locations (2), (4), (5) and (7) on respective edges between the corners, for a total of eight positions, as shown in FIG. 11B. However, the orientation of paper placed on a paper tray is decided by the size of the paper and the paper is transported in this orientation to print on the paper or discharge the paper. The edge on which stapling can be carried out, therefore, is limited to one edge that conforms to the orientation of the paper placed on the tray. In this embodiment of the invention, stapling is limited to the trailing edge in regard to the direction in which the paper is transported. However, as will be discussed later, stapling of the edge opposite the edge that can be stapled is capable of being supported by rotating the image recorded on the paper 180° in order to turn the image upside down. Accordingly, positions at which stapling can and cannot be performed are generated from among the eight positions (1)–(8) in FIG. 11B in dependence upon the orientation of the paper decided by the paper size.

At step S402 the positions at which stapling can be performed are displayed in the "STAPLING POSITION" area 1005, which specifies the stapling positions, thereby making selection of these positions possible. Positions at which stapling cannot be performed are not displayed (i.e., the positions are dimmed), thereby making selection of these position impossible. In the example of FIG. 10, position 1, positions 3 through 6 and position 8 (these are underlined candidates) are capable of being selected; the other positions are not. The encircled numerals (1)–(8) correspond to the positions 1 through 8 specified in FIGS. 4 and 10.

Figure 5:
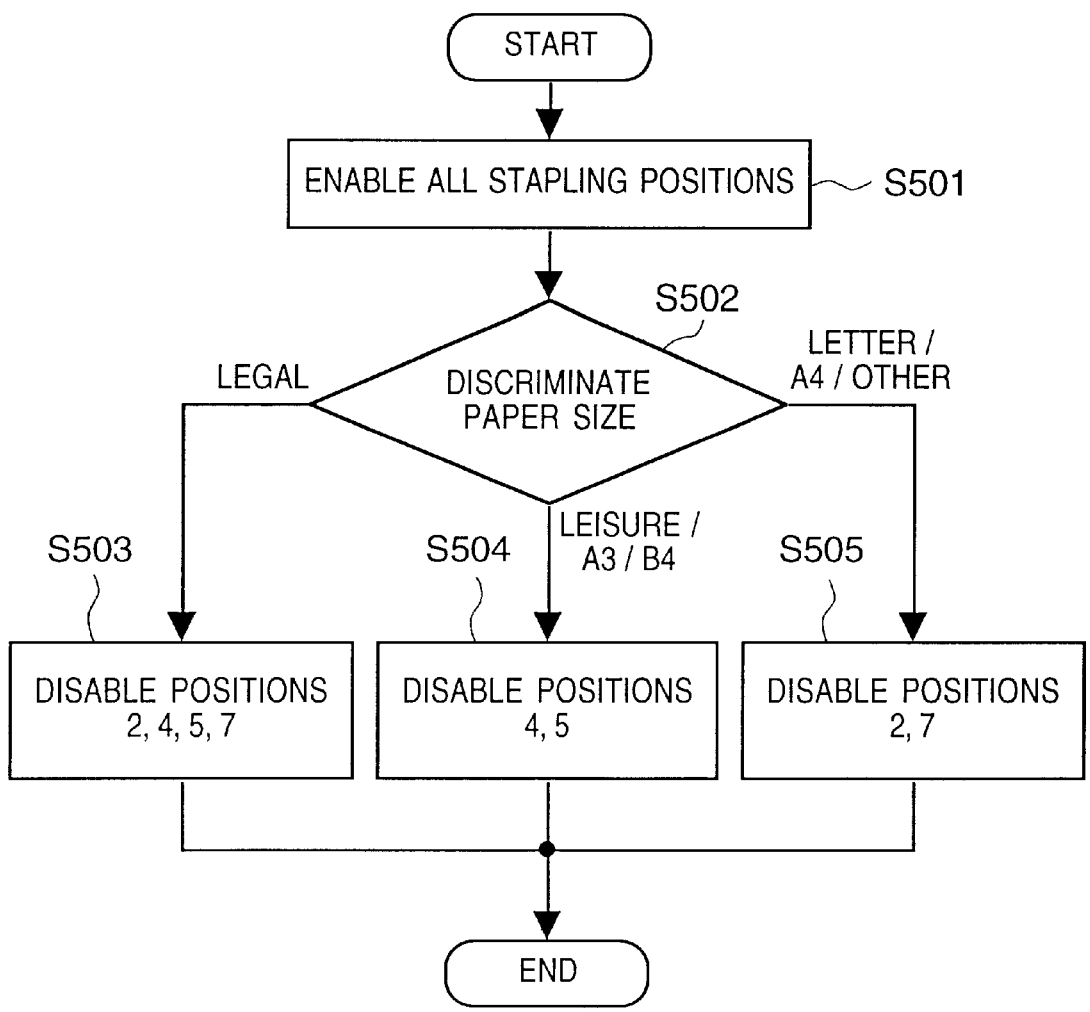
FIG. 5 is a flowchart showing a procedure for setting stapling on a screen.

FIG. 5 illustrates the details of step S402. At step S501 in FIG. 5, all stapling positions in the "STAPLING POSITION" area 1005 are enabled temporarily, and the set paper size is discriminated at step S502, with the flow of processing branching depending upon the paper size. If the size that has been set is legal size, positions 2, 4, 5, and 7 are dimmed at step S503 to disable these positions so that they cannot be selected. FIG. 12A shows an example the display in such case. If the size that has been set is leisure size or sizes A3, B4, positions 4, 5 are dimmed at step S504 to disable them. FIG. 12C shows an example of the display in this case. If the size that has been set is letter size, size A4 or some other size, positions 2, 7 are dimmed at step S505 to disable them. FIG. 12B shows an example of the display in this case. Thus, positions capable of being specified based upon paper size are selected and displayed.

Next, at step S403, the user is allowed to specify the desired stapling position from among the stapling positions being displayed in the "STAPLING POSITION" area 1005. The display performed at step S402 and the selection made at step S403 are implemented utilizing functions provided by the operating system. Any dimmed ratio button that has been checked by the user is ignored and is not dealt with as being selected. It should be noted that processing is executed in the initial state in such a manner that an appropriate position is selected in this state.

If a stapling position is specified, a bitmap image in the form of the recording paper is displayed in the bitmap display window 1004 at step S404. The bitmap image represents the selected stapling position, a separately specified page layout and stapling orientation, as well as an orientation specified by a "PRINT DATA ORIENTATION" area 1007 shown in FIG. 10. The image displayed in the window 1004 reflects the number of pages to be printed on one sheet of paper, this having been set in a "PAGE LAYOUT: NUMBER OF PAGES" area 801 on a paper setting screen shown in FIG. 8, as well as the stapling orientation set in a "STAPLING ORIENTATION" area depicted in FIG. 10.

Figure 8:
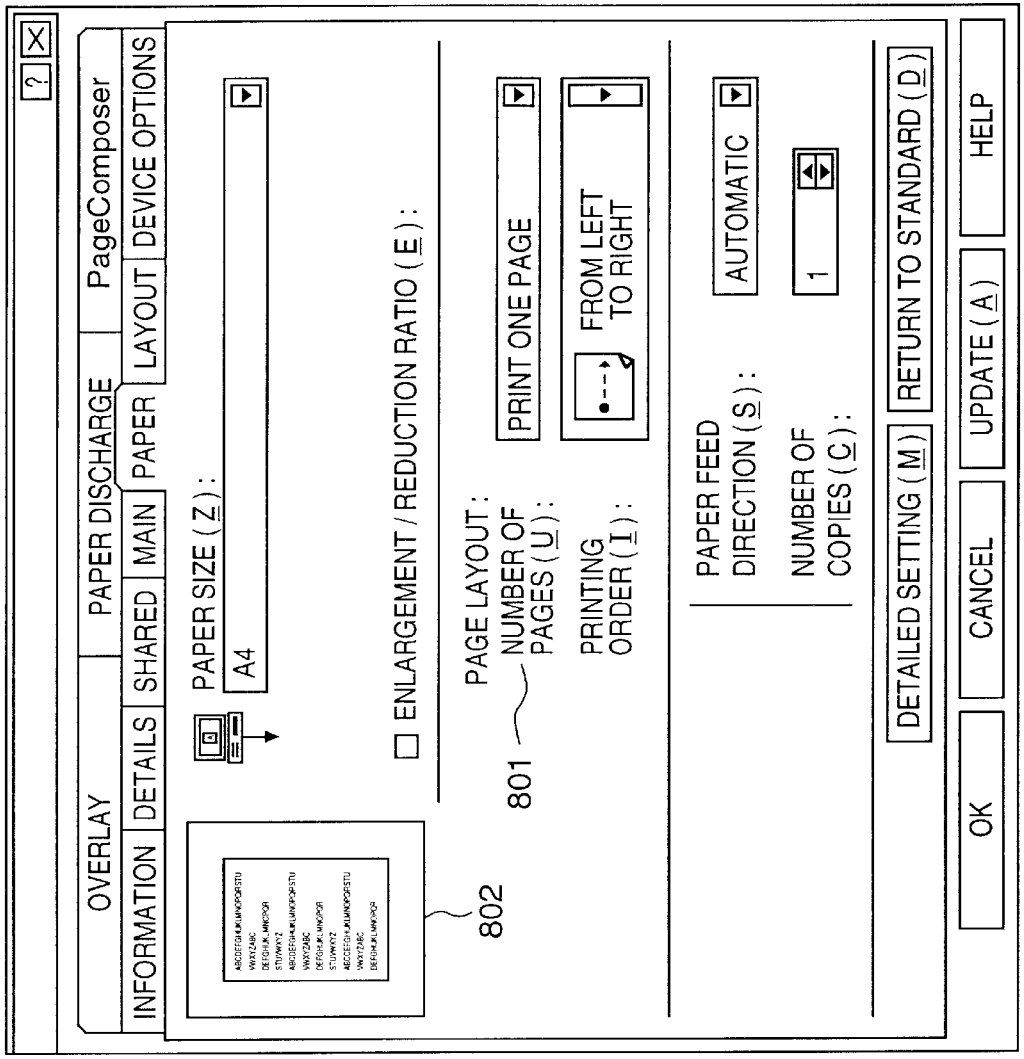
FIG. 8 is a diagram showing a paper setting screen.

The window 1004 shown in FIG. 10 is displayed as the printing of one page based upon the setting made in FIG. 8. If "PRINT TWO PAGES" has been specified, then an image indicative of the printing of two pages shown in FIG. 13B is displayed in the window 1004 of FIG. 10.

In a layout display screen shown in FIG. 9, the long left edge or long top edge has been specified at the stapling edge. The reason for this is that the long edge on the right side of the paper is stapled in case of a portrait orientation whereas the long edge on the top side of the paper is stapled in case of landscape orientation. Accordingly, a display indicating that the long edge on the left side of the paper is the stapling edge is presented on the page image in window 1004 of FIG. 10 as well. Though the edge stapled is indicated by hatching in FIG. 10, this edge can be indicated by a light-gray display if desired.

The selected stapling position is displayed within the paper image in the display window 1004 in the form of a mark 1004a indicative of the selected stapling position.

Figure 6:
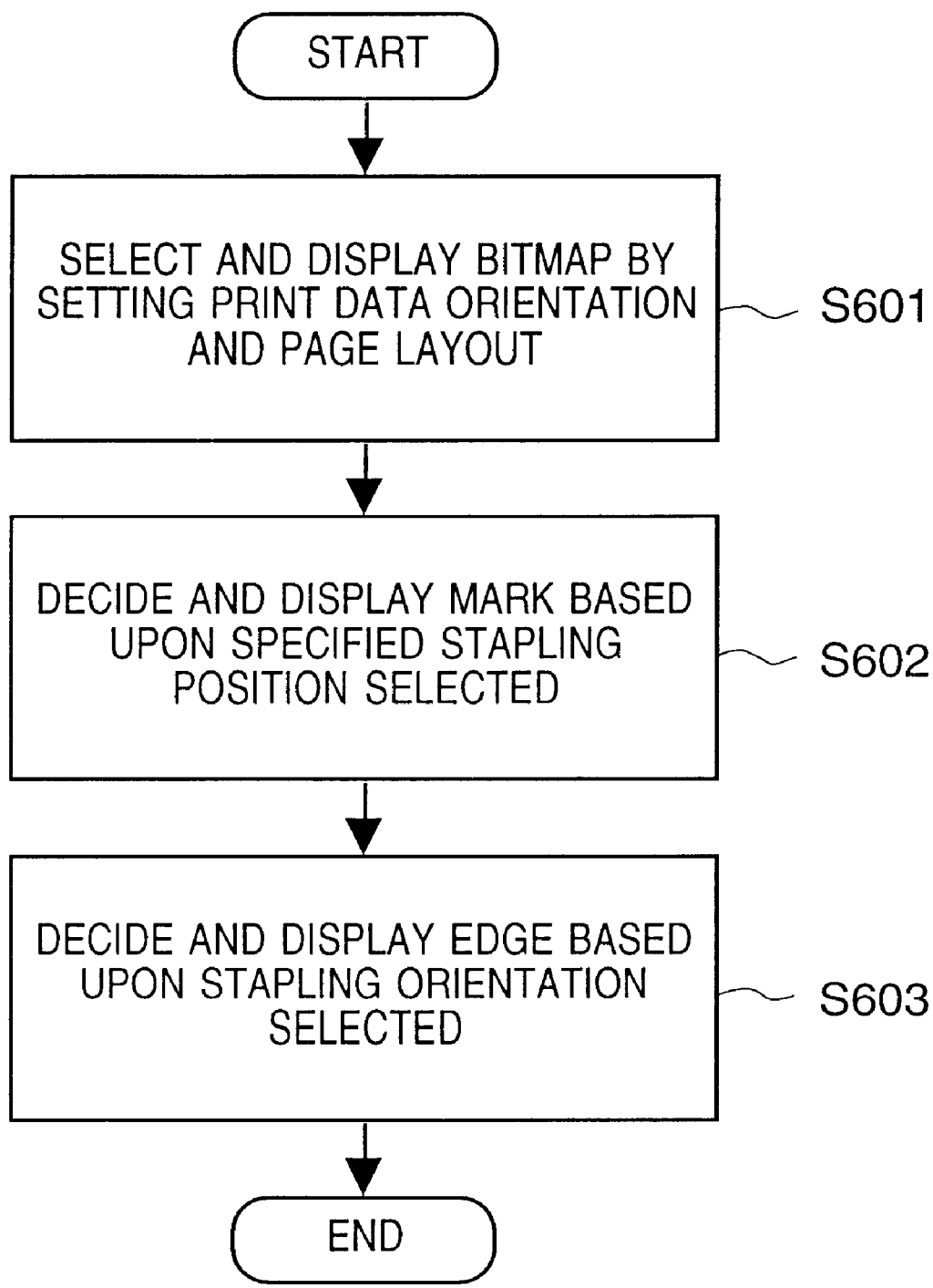
FIG. 6 is a flowchart showing a procedure for setting stapling on a screen.

FIG. 6 is a flowchart illustrating the details of step S404. By setting the specified orientation (portrait or landscape) of the print data and the page layout (how many pages are to be printed on one sheet of paper), a bitmap in line with this setting is selected from bitmap images prepared in advance and the selected bitmap image is displayed at step S601 in FIG. 6. For example, if the orientation of the print data is the portrait orientation, the image of a vertically oriented sheet of paper is selected. If the orientation of the print data is the landscape orientation, the image of a horizontally oriented sheet of paper is selected. Further, if the printing of two pages, for example, has been specified in regard to page layout, an image indicating the manner in which two pages are formed on one sheet of paper is selected.

The position of the mark 1004a is decided from the stapling position specified in the "STAPLING POSITION" area 1005 and is displayed at step S602. This is followed by step S603, at which the specified edge is decided in accordance with the selected stapling orientation, and this edge is displayed in a distinguishable manner. In regard to the form of the mark 1004a, a mark that reflects the orientation of the staple is selected in conformity with the stapling position.

Figure 7:
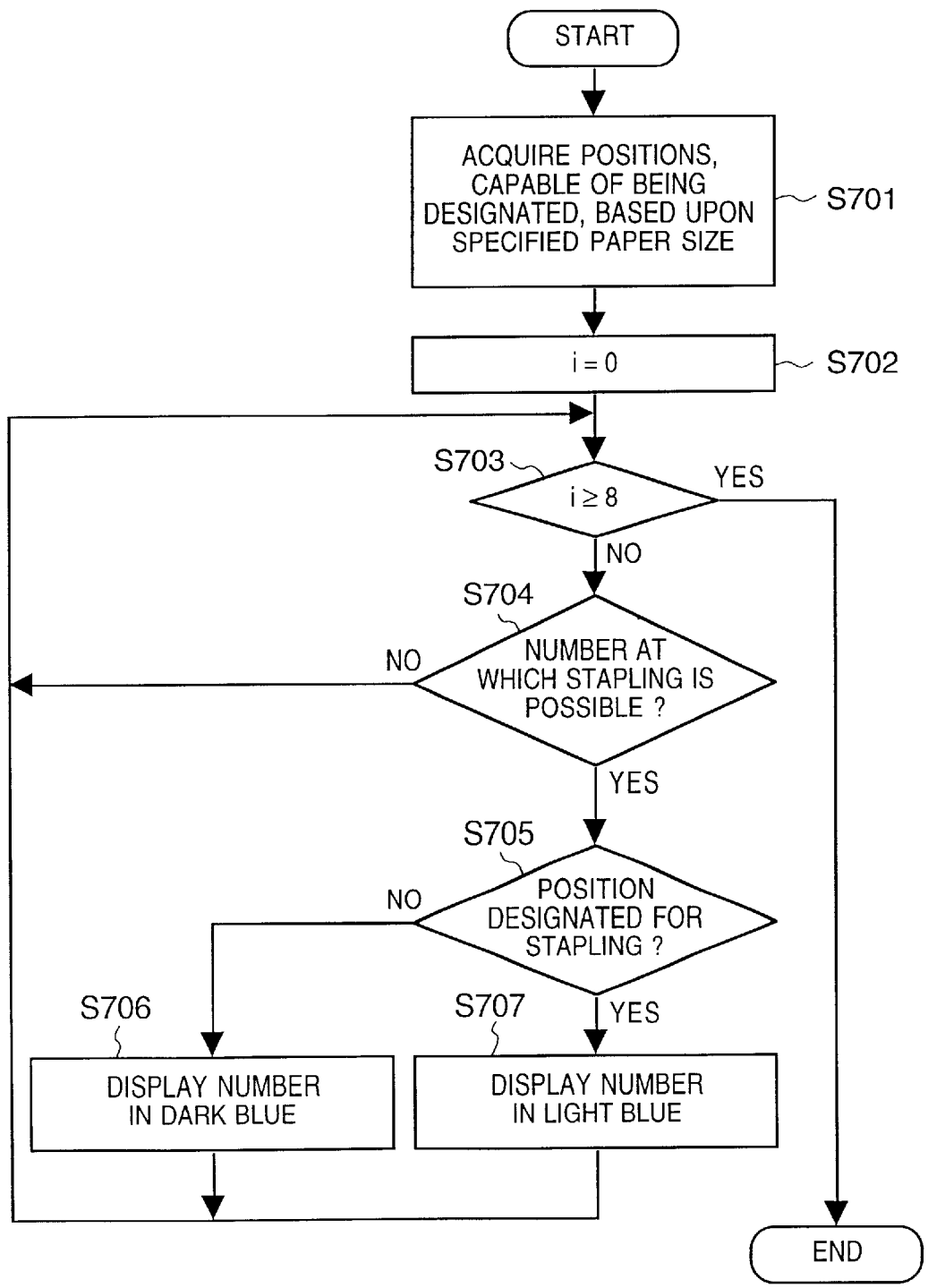
FIG. 7 is a flowchart showing a procedure for setting stapling on a screen.

Finally, at step S405 in FIG. 4, symbols representing positions at which stapling is possible and a symbol representing the specified stapling position are displayed in the display window 1004. In the example of this embodiment, the symbols are the encircled numerals. FIG. 7 is a flowchart illustrating the details of step S405.

First, positions at which stapling can be performed decided by the specified paper size are acquired at step S701. These positions are the same as those displayed as being designatable in the "STAPLING POSITION" area 1005. Next, at steps S702–S707, the numbers of the positions at which stapling can be performed are displayed sequentially from 1 to 8. That is, it is determined at step S704 whether stapling is possible. If stapling is not possible, the position is not displayed. If stapling is possible, then it is determined at step S705 whether this position has been designated as a stapling position. If the decision rendered is "YES", then the symbol (encircled numeral) indicating this position is displayed at step S707 in bright blue at the portion corresponding to the specified position in the bitmap display window 1004. If the position has been not been designated as a stapling position, on the other hand, then the symbol indicating this position is displayed at step S706 in dark blue at the portion corresponding to this position in the bitmap display window 1004. In FIG. 10, the difference between these two colors is indicated by the thicknesses of the lines of the characters. The thick line indicates a position that has been designated. By performing this operation in regard to the eight locations shown in FIG. 11B, the encircled numerals will be displayed in the manner shown in the bitmap display window 1004 of FIG. 10.

Thus, designatable stapling positions are displayed in conformity with the designation of paper size. At the same time, an image representing the format of a page that reflects the setting of five items can be displayed in the bitmap display window 1004 in dependence upon the five items, namely the designation of paper size, the designation of page layout, the designation of stapling orientation, the designation of print data orientation and the designation of stapling position.

In a case where a designation such as that of paper size has not been made, the processing of FIG. 4 is executed and the image of FIG. 10 displayed using a paper size and paper orientation deemed appropriate beforehand.

<Examples of Displays in Display Window>

FIGS. 13A–13D and FIGS. 14A–14H are examples of images displayed in the bitmap display window 1004 of FIG. 10.

Figure 14A:
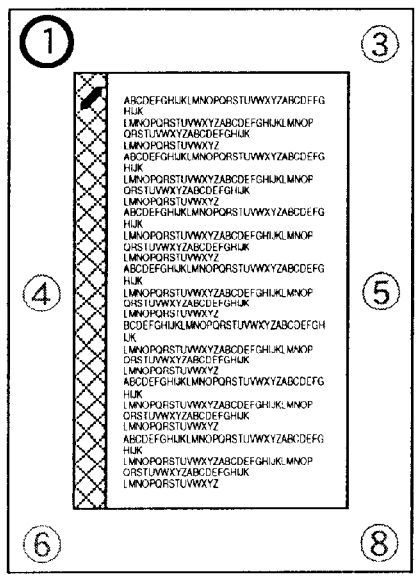
FIGS. 14A–14H are diagrams showing examples of images displayed in a display window when the setting of print data orientation is changed.

FIGS. 14A–14H are examples of images displayed in a case where the layout setting is for the printing of one page on one sheet of paper, with the stapling orientation being set at the left or top. The stapling position is set at (1) in all of the diagrams of FIGS. 14A–14H. The designations of paper size and print data orientation are as follows:

FIG. 14A . . . Size: letter/A4/other; Print data orientation: portrait

Figure 14B:
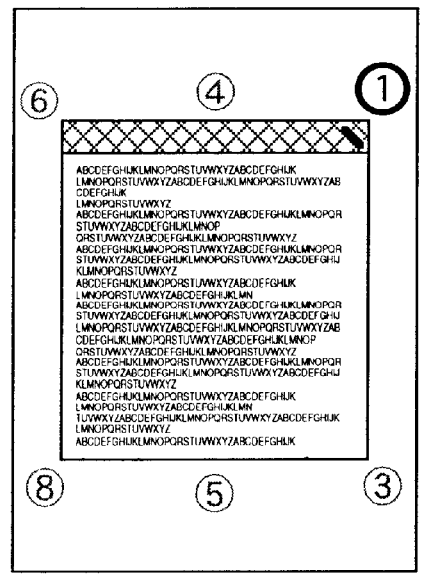

FIG. 14B . . . Size: letter/A4/other; Print data orientation: landscape

Figure 14C:
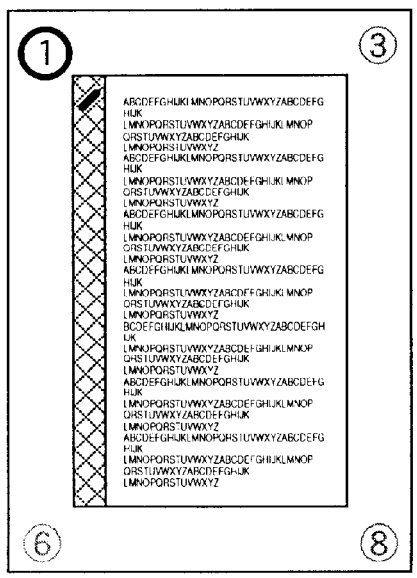

FIG. 14C . . . Size: legal; Print data orientation: portrait

Figure 14D:

FIG. 14D . . . Size: legal; Print data orientation: landscape

Figure 14E:
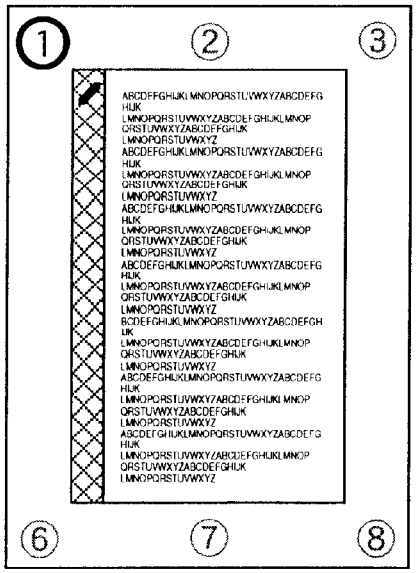

FIG. 14E . . . Size: leisure/A3/B4; Print data orientation: portrait

Figure 14F:
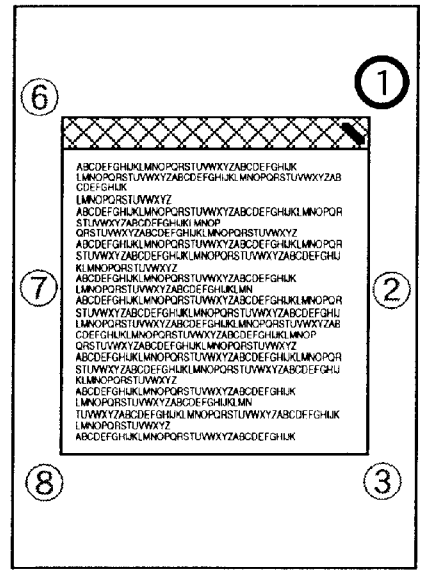

FIG. 14F . . . Size: leisure/A3/B4; Print data orientation: landscape

Since paper of the leisure/A3/B4 size is transported in a direction parallel to the long edges, a short edge is the edge at which stapling is possible. Since paper of other sizes is transported in a direction parallel to the short edges, a long edge is the edge at which stapling is possible. Consequently, even if the orientation of the print data is changed, the stapling positions do not change with respect to the shape of the paper. In this example, it is assumed that only paper of legal size cannot be stapled at a position midway along an edge.

Figure 14G:
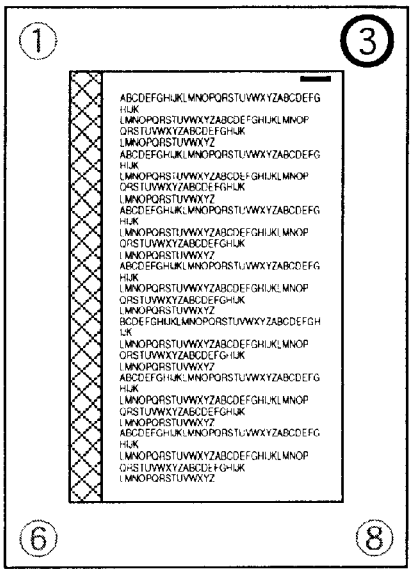
Figure 14H:

FIGS. 14G and 14H illustrates cases where (3) has been designated at the stapling position for legal-size paper.

FIG. 14G . . . Size: legal; Print data orientation: portrait (stapling position: (3))

FIG. 14H . . . Size: legal; Print data orientation: landscape (stapling position: (3))

These cases differ from the other cases. Specifically, since the staple is oriented along the short edge, the mark also is displayed in an orientation that indicates this. If stapling is performed at a corner, the staple is oriented at an angle with respect to the direction of the paper, with the exception of the cases shown in FIGS. 14G and 14H.

It should be noted that when a position along an edge has been designated and not a corner position, stapling is performed at two locations with staples that are parallel to the edge.

Since the content of a display is thus changed in dependence upon the orientation of print data so as to reflect the orientation, the user is capable of setting a stapling position intuitively just as if he or she were actually reading the document while holding it.

Figure 13A:
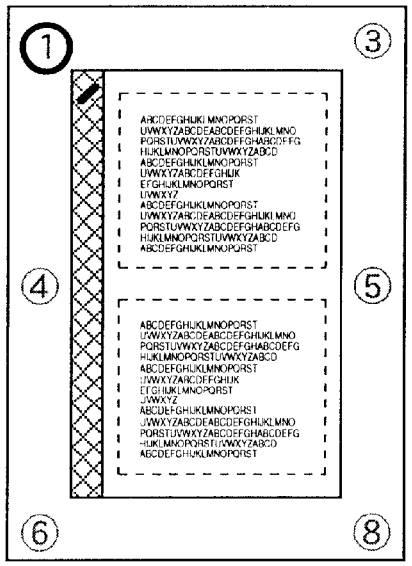
FIGS. 13A–13D are diagrams showing examples of images displayed in a display window when the setting of a page layout is changed.
Figure 13B:
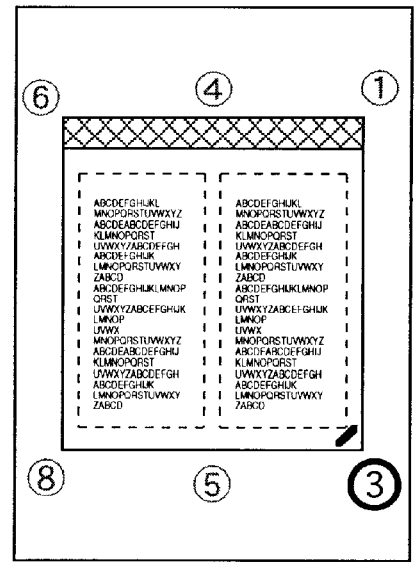

FIGS. 13A, 13B are examples of displays in a case where a page layout has been set so as to print two pages on one sheet of paper. Paper size is set at A4 and the stapling orientation is set as left or top.

FIG. 13A . . . Page layout: two-page printing; Print data orientation: landscape; stapling position: (1)

FIG. 13B . . . Page layout: two-page printing; Print data orientation: portrait; stapling position: (3)

In the case of two-page printing, each page of ordinary size is reduced to about 70% of ordinary size and the two reduced pages are placed side by side or one above the other. To accomplish this, the orientation of the paper becomes that obtained by rotating the set print data orientation by 90°.

Figure 13C:
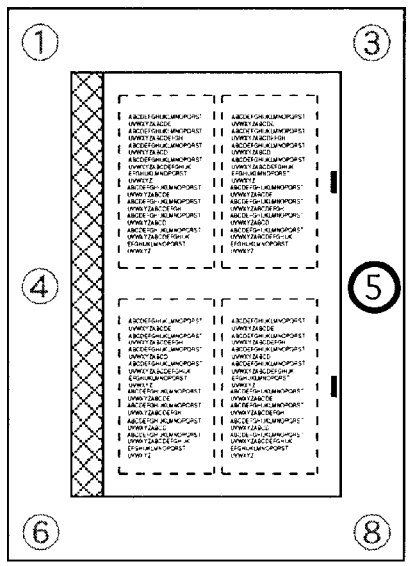
Figure 13D:
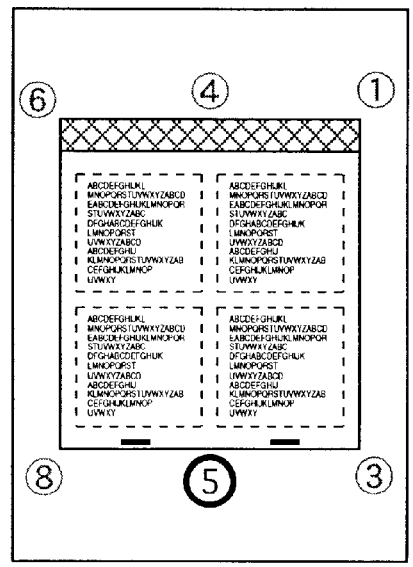

FIGS. 13D, 13D are examples of displays in a case where a page layout has been set so as to print four pages on one sheet of paper.

FIG. 13C . . . Page layout: four-page printing; Print data orientation: portrait; stapling position: (5)

FIG. 13D . . . Page layout: four-page printing; Print data orientation: landscape; stapling position: (5)

In case of four-page printing, the orientation of the print data and the orientation of the paper coincide. It should be noted that a portion along the edge has been designated as the stapling position in each of FIGS. 13C and 13D. In this case stapling is performed at two locations, at mentioned above, and therefore the marks indicating the stapling positions also are displayed at two locations in accordance with the positions of the staples.

By way of example, consider paper of size A4 and the portrait orientation as the orientation of the print data. If the page layout is made one-page printing, then two-page printing and then four-page printing in this case, then the images displayed will as shown in FIGS. 14A, 13B and 13C, respectively. However, the designated stapling positions also change.

Thus, it is possible to display an image that allows the user to ascertain stapling position intuitively by looking at the orientation of the print data. As a result, it is possible to provide an easily operable user interface that allows the user to accurately grasp and designate stapling position without performing trial printing.

<Warning Output>

There are instances where even though stapling has been set in the manner described above, the setting cannot actually be applied. In such cases it is necessary to so inform the user so as to prompt the user to change the setting.

Figure 15:
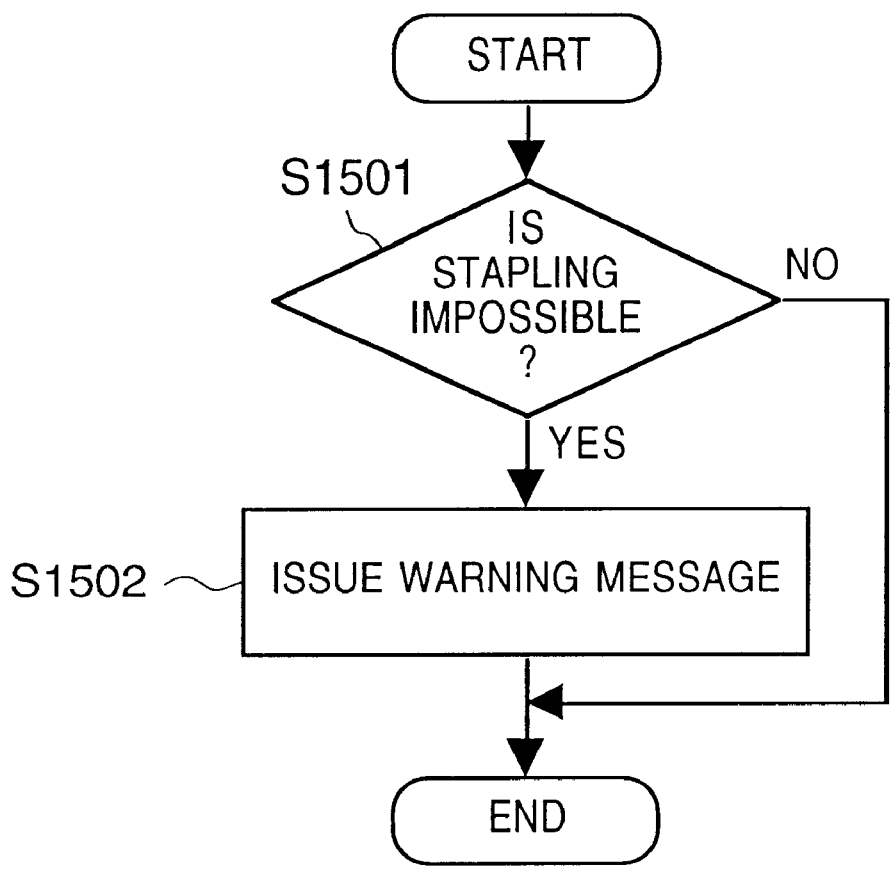
FIG. 15 is a flowchart of a procedure for monitoring a state in which stapling is impossible.

FIG. 15 is a flowchart of a procedure for monitoring a state in which stapling is not possible, namely a state in which a designated stapling position is not suited to the paper size. At execution of printing, it is determined at step S1501 whether a stapling position designatable at a designated paper size has been set as a stapling position. If stapling is not possible, a warning message is output by display or voice at step S1502. In the procedure of FIG. 4, a stapling position that can be designated at a designated paper size can be selected, and therefore stapling is always possible. However, in a case where printing is being carried out from an application program, a situation can arise where, depending upon the application program, the setting of paper size changes regardless of the stapling designation. In such case the designated stapling position and the changed setting of the paper size may be incompatible. If such is the case, a warning is issued at step S1502. Accordingly, the processing procedure of FIG. 15 is executed in a case where paper size has changed after the designation of stapling position.

Figure 16:
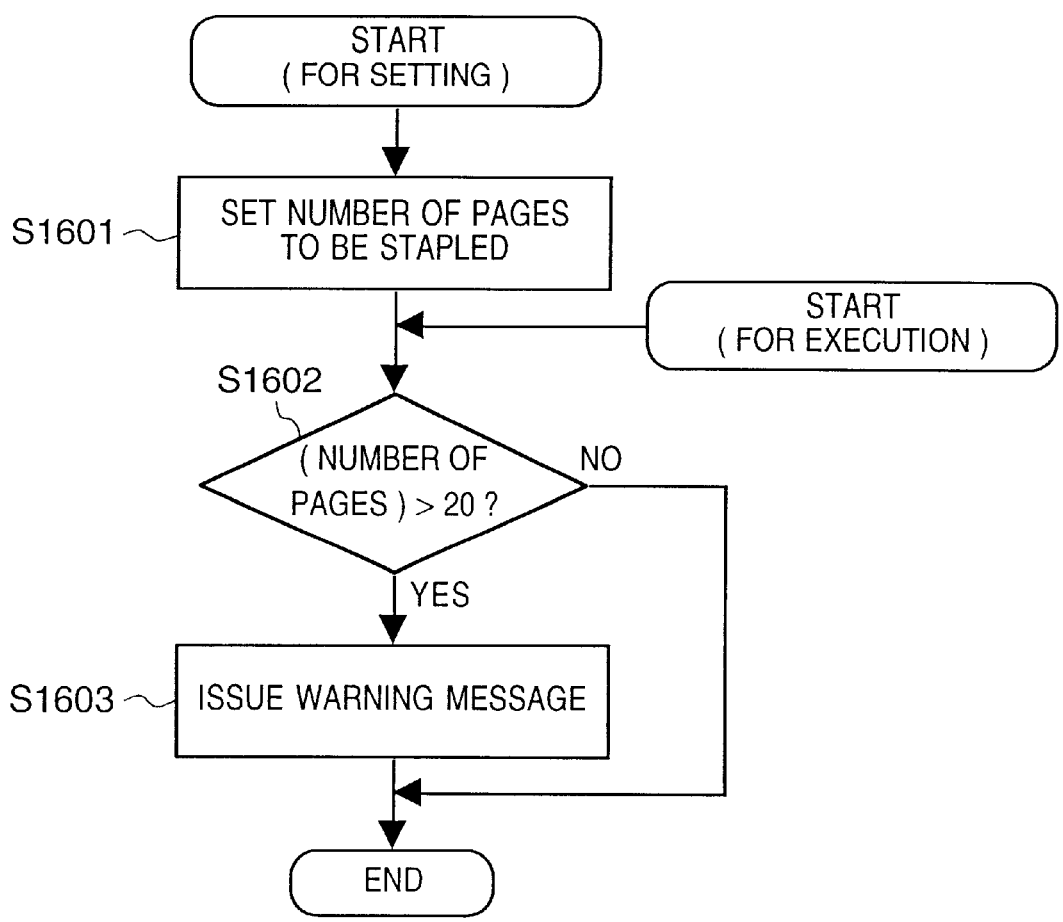
FIG. 16 is a flowchart of a procedure for monitoring number of pages that can be stapled.

FIG. 16 is a flowchart of processing for monitoring instances where a number of pages designated so that they may be bound by stapling exceeds the number of pages that can be bound. When the number of pages is set, monitoring is performed in the following manner: When the number of pages is set at step S1601, it is determined at step S1602 whether the set number of pages has exceeded 20. If the answer is "YES", then a visual or voice message is output to warn the user at step S1603. The setting of the number of pages at step S1601 is not limited to a manual operation performed by the user. There are cases where the number of pages that should be printed is provided by the application program.

Further, a procedure similar to that from step S1602 onward is performed whenever one page of data is generated at execution of printing. If more than 20 pages have been designated as the number of copies to be bound, a warning message is output in similar fashion.

<Printout Procedure>

Figure 18:
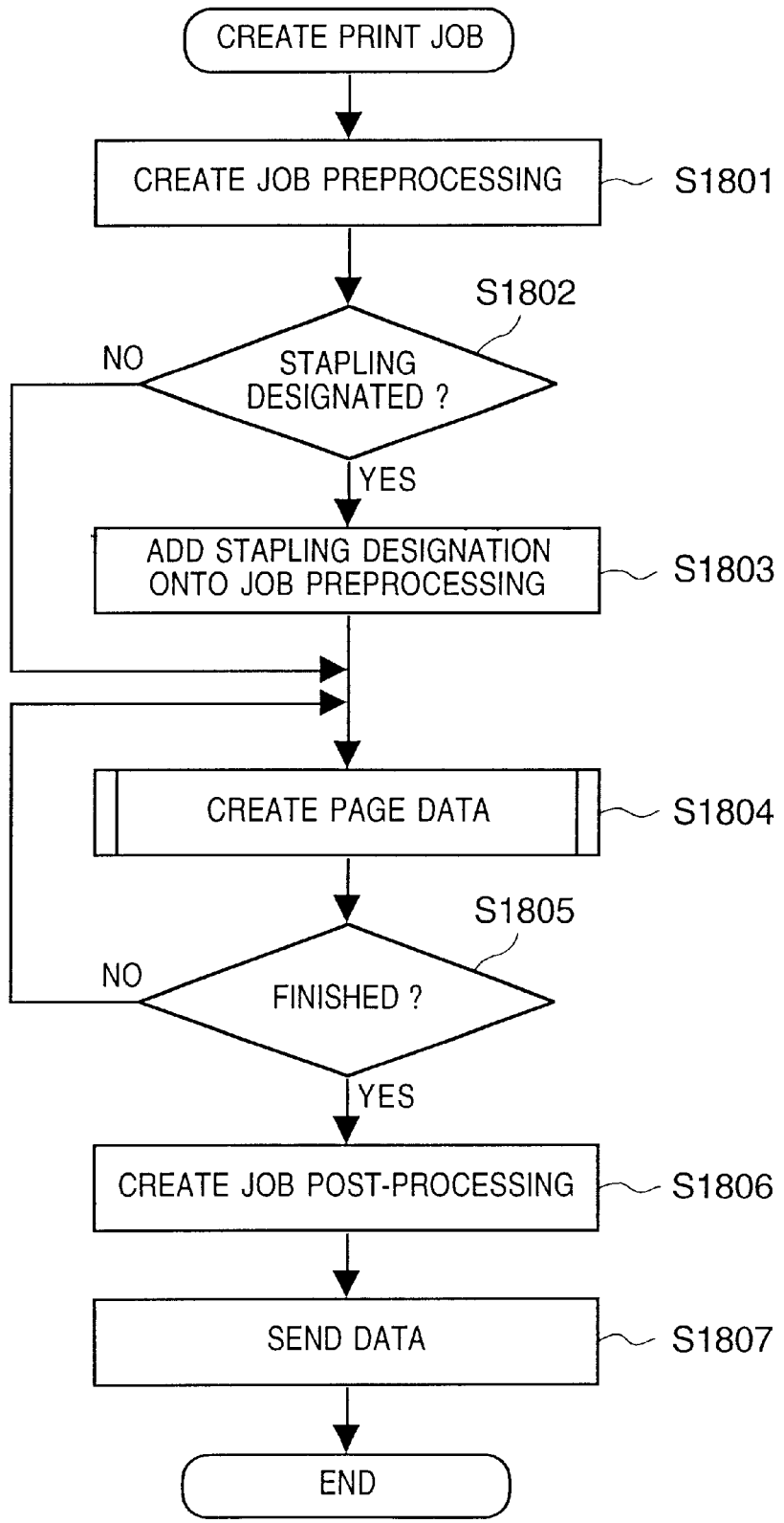
FIG. 18 is a flowchart of a procedure for creating print data by a printer driver.
Figure 19:
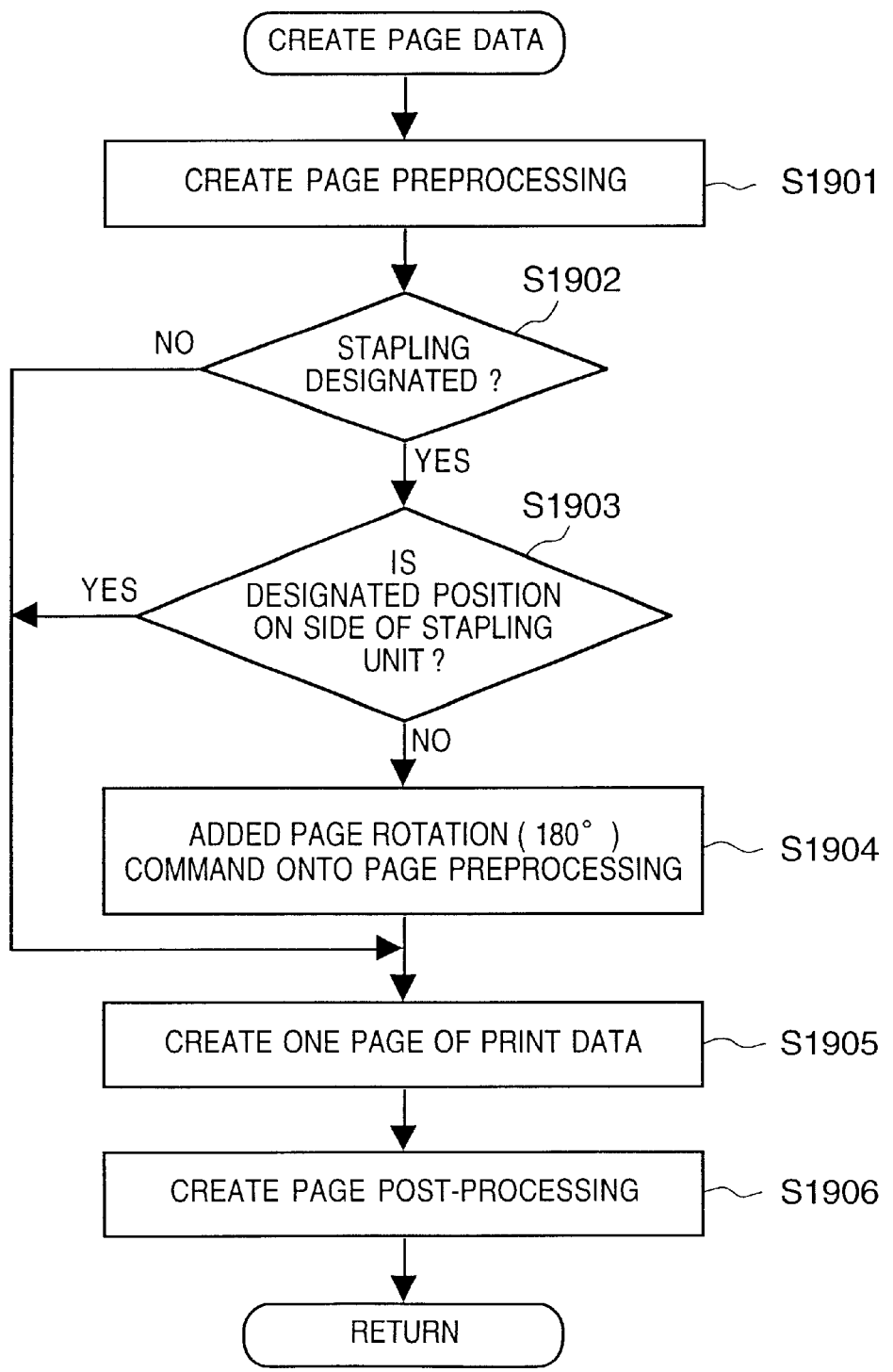
FIG. 19 is a flowchart of a procedure for creating page data by a printer driver.

FIGS. 18 and 19 illustrate procedures executed by the printer driver when a printing job is created using a stapling setting established in accordance with FIG. 4 and the job is output to the printer 1500. The print job is of the type in which print data is preceded by job preprocessing and succeeded by job post-processing. The print data has a format in accordance with which one page of print data is preceded by page preprocessing and succeeded by page post-processing on a page by page basis.

Job preprocessing is created at step S1801 in FIG. 18. If stapling has been designated ("YES" at step S1802), then stapling designation is added onto the job preprocessing at step S1803. This designation includes a designation of stapling position. It should be noted that the procedure of FIG. 15 for discriminating whether stapling is possible or not may be executed as a part of step S1801. If it is determined that stapling is not possible, then, after a warning is issued, the setting may be performed again or the stapling designation may be ignored.

This is followed by step S1804, at which page data is created for every page. This step is repeated until the creation of page data for all pages is completed ("YES" at step S1805). This is followed by the creation of job post-processing at step S1806. Created data equivalent to one print job is sent to the printer at step S1807.

FIG. 19 is a flowchart of a procedure for creating page data at step S1804. Page preprocessing is crated at step S1901. The page preprocessing includes page layout designation, etc. This is followed by step S1902, at which it is determined whether stapling has been designated. If the answer is "YES", then it is determined at step S1903 whether the stapling position is on the side of the stapling unit. If paper size is A4, for example, at the time of printing, the paper is transported upon arranging it so that the left side of the paper will be at the front if the orientation of the print data is the portrait orientation and so that the upper side of the paper will be at the front if the orientation of the print data is the landscape orientation. With the mechanism of FIG. 17, therefore, the stapling position will be the trailing edge in terms of the transport direction, i.e., the right side of the paper if the print data has the portrait orientation and the lower side of the paper if the print data has the landscape orientation. Accordingly, taking FIG. 14A as an example, stapling can be performed only at positions (3), (5) and (8). If positions (1), (4) and (6) have been designated, therefore, printing is performed upon rotating the image by 180° and the designated location is bound by stapling.

For this reason, a page rotation command for rotating the image by 180° is added onto the page preprocessing at step S1904 if the designated stapling position is not on the side of the stapling unit. This is followed by step S1905, at which one page of print data is created, and then by step S1906, at which page post-processing is created. The processing of FIG. 19 is then terminated.

If the job pre-processing includes the rotation command, the printer that has thus been sent the print data rotates the image to be generated, performs stapling at the stapling position specified by job pre-processing and outputs the printed matter.

Thus, with the printing system described above, the user is allowed to specify the stapling position from among positions, decided based upon the paper, at which stapling is possible. As a result, it is possible to prevent a situation in which a position at which stapling is impossible is designated, an error that is usually noticed after the start of printing.

In addition, since a selected stapling position, page layout and stapling orientation are displayed in the form of a bitmap image, the user is capable of readily grasping the positional relationship among these items and of setting a stapling position quickly and accurately.

Further, since positions capable of being set as stapling positions also are displayed on the bitmap image, it is easy to ascertain the stapling position.

In a case where stapling is not possible, a warning is issued on the monitor of a host computer or by voice. This makes it possible to immediately ascertain a situation in which stapling is impossible, thus enabling the user to reset the stapling position promptly.

Further, since the image is rotated depending upon the designated stapling position, a document can be bound at a desired position by stapling even if a stapling unit has been provided for only one edge.

[Second Embodiment]

Described next will be a processing procedure through which a screen of the kind shown in FIG. 10 is displayed regardless of the stapling designation. In accordance with this procedure, the operator is capable of setting a stapling position while observing the image displayed in the display window 1004. To accomplish this, the procedures of FIGS. 20A, 20B are used instead of the procedure shown in FIG. 4 of the first embodiment.

Figure 20A:
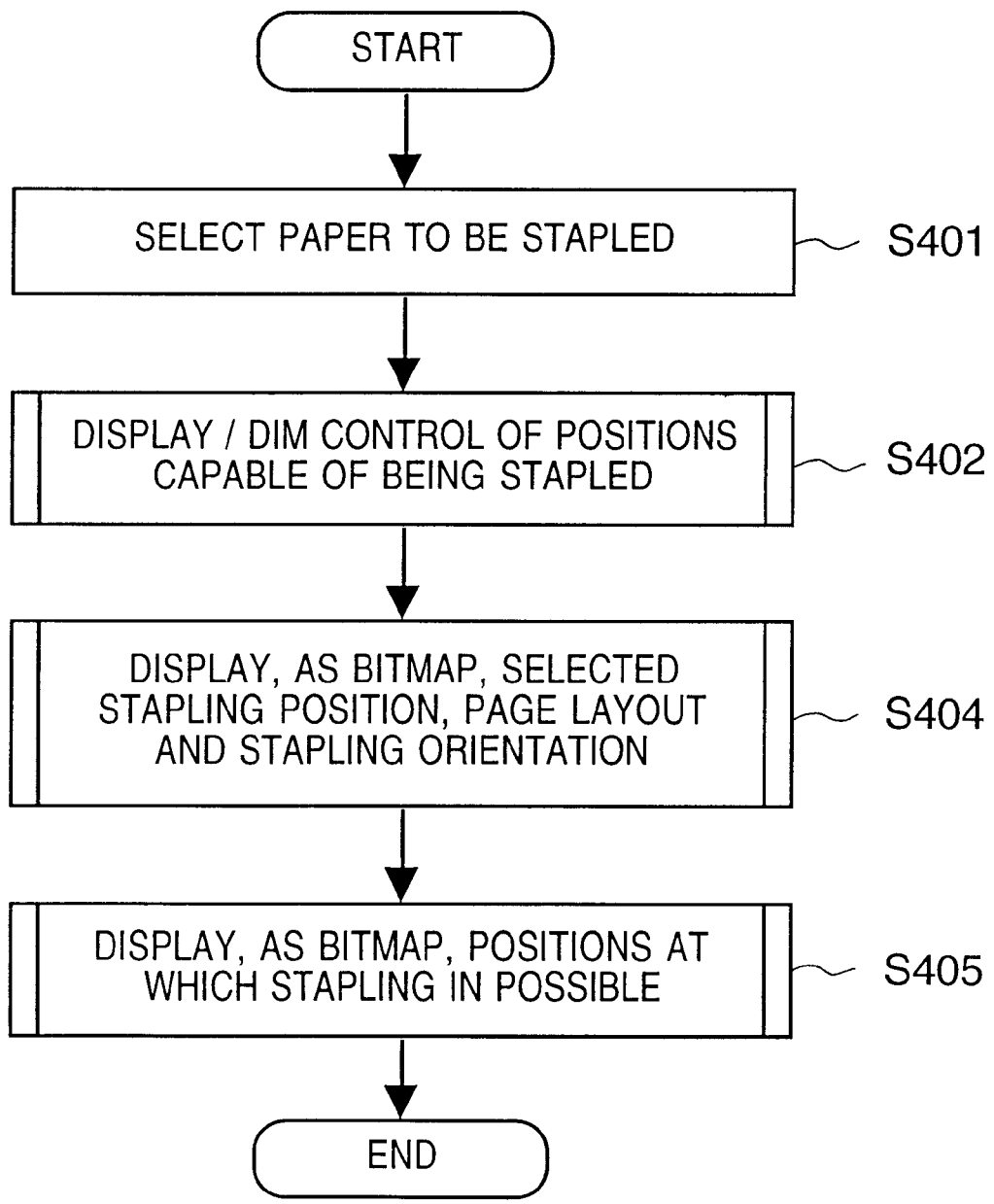
FIG. 20A is a flowchart of a procedure for displaying a stapling setting screen in a second embodiment of the present invention.
Figure 20B:
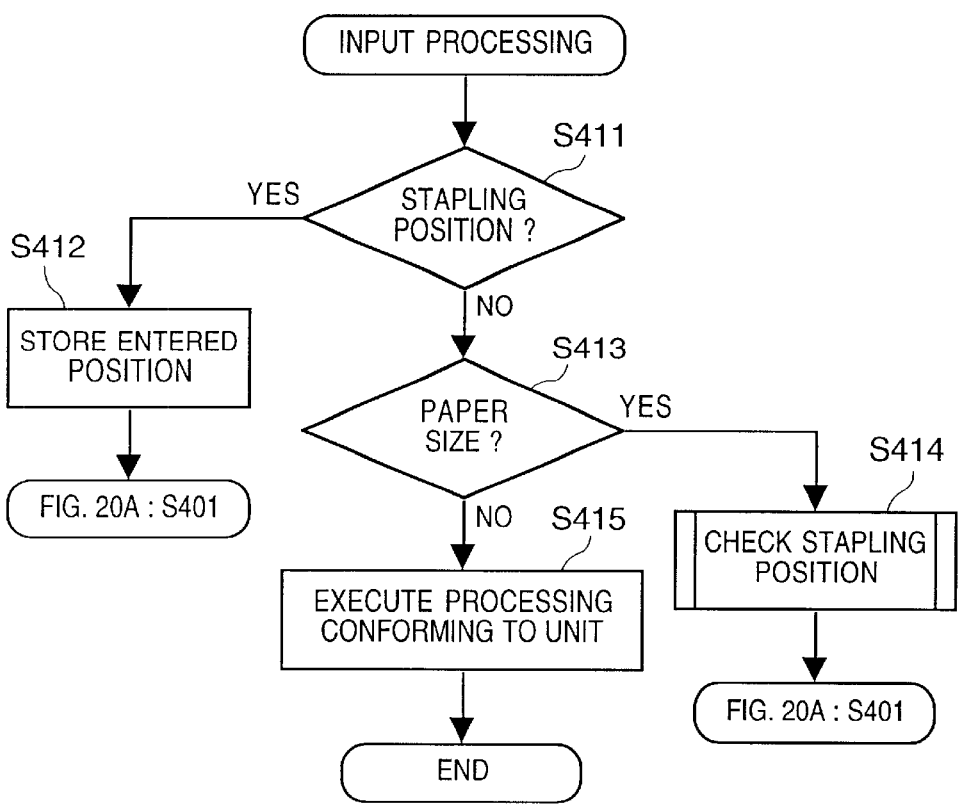
FIG. 20B is a flowchart showing a procedure for setting stapling on a screen.

FIG. 20A is a flowchart of a procedure for displaying an image in the display window 1004 on the display screen of FIG. 10.

First, paper size is set in the "PAPER TO BE STAPLED" text box 1006 at step S401. FIG. 11A shows the text box 1006 in the highlighted state. This indicates that a setting has been made in the text box 1006. The size of the paper to be stapled is specified as being size A4 in FIGS. 10 and 11A. The specified size is stored in the RAM 2 as related data.

Positions at which stapling can and cannot be performed, which are decided by the designated paper size, are displayed in the "STAPLING POSITION" area 1005 in FIG. 10. This step is similar to step S402 in FIG. 4.

A bitmap image in the form of the recording paper is displayed in the bitmap display window 1004 at step S404. The bitmap image represents the selected stapling position, a separately specified page layout and stapling orientation, as well as an orientation specified by the "PRINT DATA ORIENTATION" area 1007 shown in FIG. 10. Initially, no stapling position will have been designated. All stapling positions capable of being designated, therefore, are displayed in an unselected state.

Thus, stapling positions capable of being designated in dependence upon the designation of paper size are displayed and, if a stapling position has been designated, so is the designated stapling position. At the same time, an image representing the format of a page that reflects the setting of five items can be displayed in the display window 1004 in dependence upon the five items, namely the designation of paper size, the designation of page layout, the designation of stapling orientation, the designation of print data orientation and the designation of stapling position.

In a case where a designation such as that of paper size has not been made, the processing of FIG. 20A is executed and the image of FIG. 10 displayed using a paper size and paper orientation deemed appropriate beforehand.

FIG. 20B is a processing procedure for a case where an input has been made on the screen of FIG. 10. It is determined at step S411 in FIG. 20B whether the entered item is stapling position. The user is allowed to designated the desired stapling position from the stapling position displayed in the "STAPLING POSITION" area 1005 of FIG. 10. The user designates stapling position, etc., while observing the screen displayed through the procedure of FIG. 20A. This selection is made utilizing functions provided by the operating system. Any dimmed portion that has been checked by the user is ignored and is not dealt with as being selected.

If a stapling position is specified, this position is stored at step S412, processing branches to step S401 in FIG. 20A and the screen of FIG. 10 is updated. It is determined at step S413 whether the input is designation of paper size. If the answer is "YES", the procedure of FIG. 15 is executed at step S414, where it is determined whether the designated stapling position and the designated paper size conform. An alarm is issued if the two do not conform. Processing then branches to step S401 in FIG. 20 to update the screen of FIG. 10.

If neither stapling position nor paper size has been specified, then processing conforming to the input is executed at step S415.

Thus, even if stapling position has not been designated, positions on the paper at which stapling is possible can be graphically displayed.

[Third Embodiment]

Figure 21:
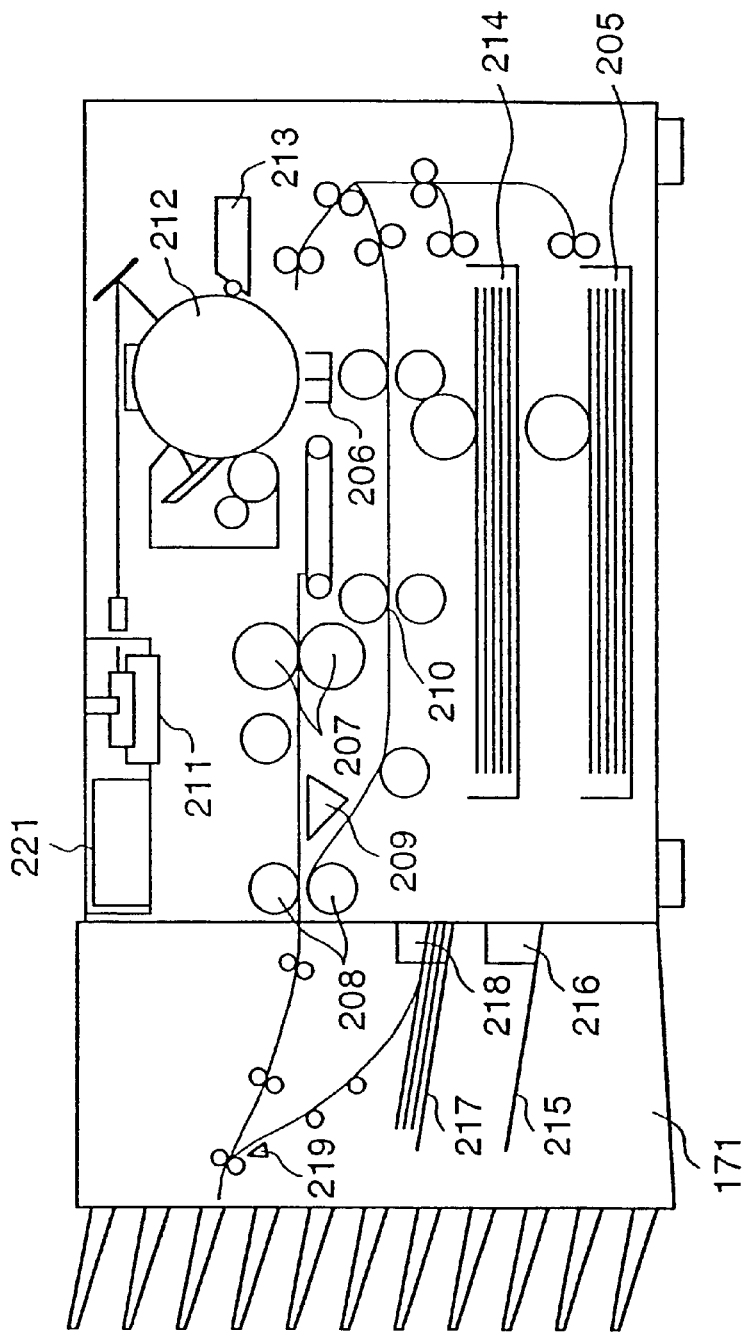
FIG. 21 is a sectional view of a printer in a third embodiment.

In the third embodiment, method for controlling a printing apparatus having a punching function in addition to a stapling function is explained. A mechanism for punching may be provided at a position below the stapling mechanism described in the first embodiment. FIG. 21 is a cross-sectional view of a printer having a punching unit 218 and a punching bin 217. Paper discharged from the discharge rollers 208 is transported to the punching unit 218 or the stapling unit 216 in accordance with a path determined by a flapper 219.

To utilize the punching function of the printer, a user instructs to use the punching function and designates a punching position or positions and a pitch of holes from a computer, connected to the printer, similarly to when utilizing the stapling function described in the first embodiment.

Figure 22:
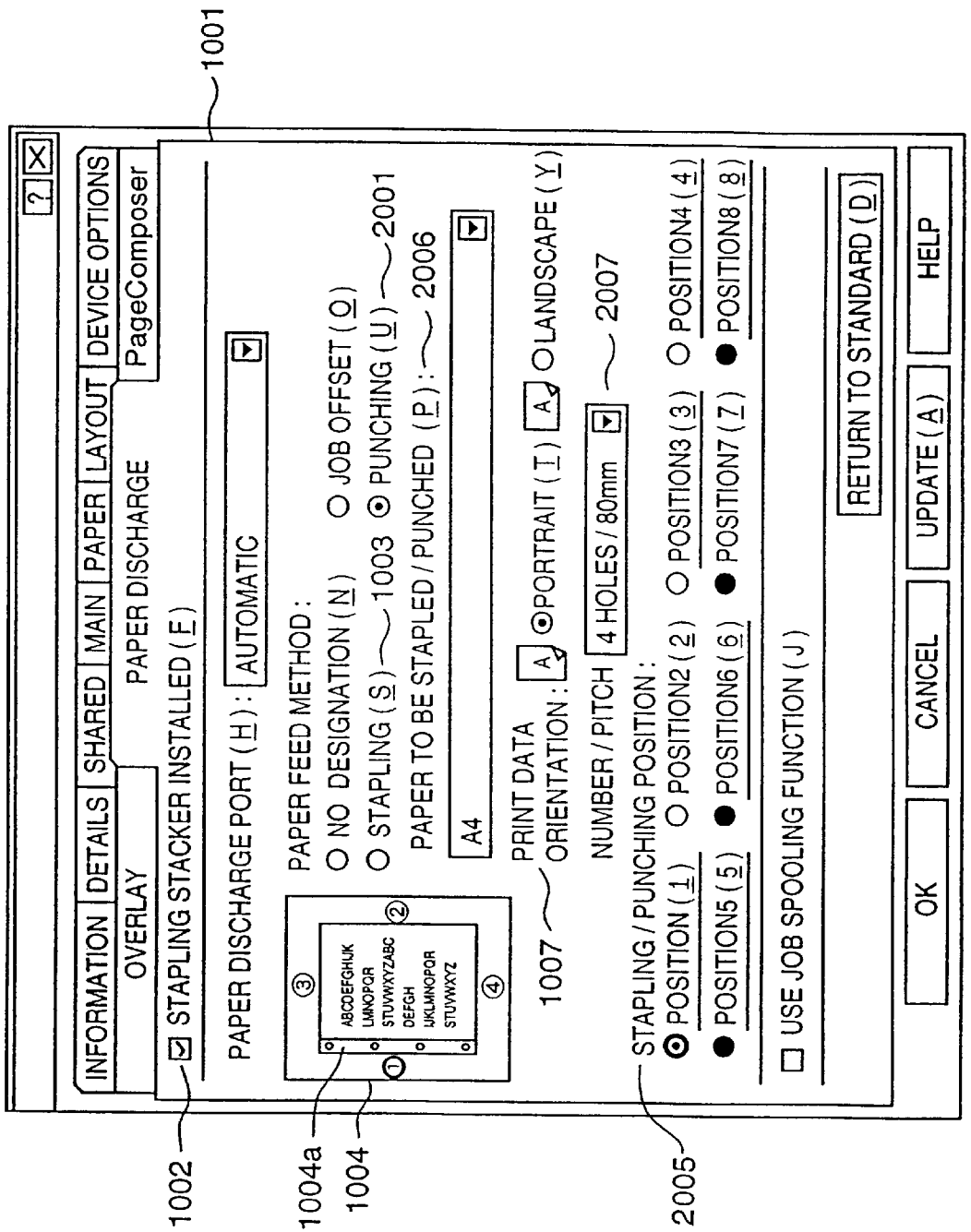
FIG. 22 is a diagram showing a binding setting screen.

FIG. 22 shows an example of an image displayed on a display screen of the computer for setting a position or positions to be punched. The image corresponds to FIG. 10 of the first and second embodiments; therefore, differing points between FIGS. 22 and 10 are explained. In FIG. 22, punching is designated by checking a "PUNCHING" box 2001. Accordingly, a "NUMBER/PITCH" text box 2007 is displayed, and the user sets the number and pitch of a hole or holes in the text box 2007. Note, no hole can be punched at a corner of the paper, differing from stapling. Therefore, the numbers ① to ④ representing sides that can be punched, are displayed as candidates in the window 1004. In the window 1004, ① and ② represent the long sides, and ③ and ④ represent the short sides. In this case, the positions 5 to 8 in a "STAPLING/PUNCHING POSITION" area 2005 can not be designated, and when one of these positions is selected, the selection is ignored.

When the user designates to perform punching, the user designates the side to be punched in the area 2005 while checking the window 1004, further designates the number and pitch of holes to be made in the text box 2007.

FIG. 23 is a table of available number/pitch of holes. For making two holes, for instance, a pitch of 80 mm may be selected; for punching four holes, one of pitches 80 mm, 70 mm, and 57 mm may be selected. It is possible to add pitches other than above, of course. The punching unit capable of changing pitch and number of holes may be realized with one punching cutter by repeating punching operation the designated number of times after moving by a designated pitch. Note, when the number of holes to be made is limited to two or four, for instance, a mechanism for punching simultaneously may be realized by providing the same number of punching cutters as the limit number of holes.

By operation on the screen as shown in FIG. 22, the setting of hole positions is performed by almost the same procedure as for stapling explained in the first embodiment if "stapling" is substituted by "punching". More specifically, except that paper is punched in the third embodiment while paper is stapled in the first embodiment, the setting of hole positions is performed in almost the same procedure described with reference to FIGS. 4 to 7, FIGS. 15 and 16, and FIGS. 18 to 20. However, there are slight differences in the procedure between stapling and punching, the differences are explained below.

First, no hole can be made at a corner, and punching is performed only along a side. Therefore, the areas where punching can be performed are the leading side and the trailing side of conveyed paper. The printer of the third embodiment conveys paper of legal size, leisure size, A3 and B4 in the lengthwise direction, whereas paper of letter size, A4, for example in the widthwise direction. Therefore, the areas where punching can be performed in paper of, e.g., leisure size are the sides ③ and ④, and, in paper of, e.g., the other size, the sides ① and ②. Accordingly, in steps S503 and S504 in FIG. 5, the positions 1 and 2 are excluded, and in steps S505, the positions 3 and 4 are excluded.

Further, since the number of areas where punching can be performed is four, whether or not i≧4 is determined in step S703 in FIG. 7.

With the aforesaid procedure, it is possible for the user to designate a position or positions to be punched while confirming the position or positions to be punched.

The present invention can be applied to a system constituted by a plurality of devices (e.g., a host computer, interface, reader, printer, etc.) or to an apparatus comprising a single device (e.g., a copier or facsimile machine, etc.).

Further, the object of the present invention can also be achieved by providing a system or apparatus with a storage medium storing the program codes of the procedures shown in FIGS. 4 through 7, FIGS. 15 and 16 and FIGS. 18 through 20B for performing the aforesaid functions of the foregoing embodiments, reading the program codes with a computer (or CPU or MPU) of the system or apparatus from the storage medium, and then executing the program codes.

In this case, the program codes read from the storage medium implement the novel functions of the invention, and the storage medium storing the program codes constitutes the invention.

Further, the storage medium for storing the program codes can be a floppy disk, hard disk, optical disk, magneto-optical disk, CD-ROM, CD-R, magnetic tape, non-volatile type memory card or ROM, by way of example.

Furthermore, besides the case where the aforesaid functions according to the embodiments are implemented by executing the program codes read by a computer, the present invention covers a case where an operating system or the like working on the computer performs a part of or the entire process in accordance with the designation of program codes and implements the functions according to the embodiments.

The present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the functions of the above embodiments.

Thus, in accordance with the present invention, as described above, it is possible to control a printing apparatus having a paper binding function, and the binding position can be set simply and accurately with excellent operability.

More specifically, the user is allowed to specify a stapling position from among positions, decided based upon the paper, at which stapling is possible. As a result, it is possible to prevent a situation in which a position at which stapling is impossible is designated. Thus, an error that is usually noticed only after the start of printing can be avoided.

In addition, since a selected stapling position, page layout and stapling orientation are displayed as an image, the user is capable of readily grasping the positional relationship among these items and of setting a stapling position quickly and accurately.

Further, since positions capable of being set as stapling positions also are displayed on the image, it is easy to ascertain the stapling position.

In a case where stapling is not possible, a warning is issued. This makes it possible to immediately ascertain a situation in which stapling is impossible, thus enabling the user to reset the stapling position promptly.

Further, since the image is rotated depending upon the designated stapling position, a document can be bound at a desired position by stapling even if the printing device is one capable of performing stapling at only one edge.

As many apparently widely different embodiments of the present invention can be made without departing from the spirit and scope thereof, it is to be understood that the invention is not limited to the specific embodiments thereof except as defined in the appended claims.

What is claimed is:

1. A printing control apparatus for controlling a printing device having a function for binding paper output by the printing device, comprising:
    paper condition input means for inputting a paper condition; and
    display control means for displaying on a screen a plurality of selectable binding positions at which the printing device can bind papers,
    wherein said display control means controls a display of the selectable binding positions in accordance with the paper condition input by said paper condition input means, and
    wherein the paper condition includes a size of the paper.

2. The apparatus according to claim 1, further comprising selecting means for selecting one of the selectable binding positions displayed by said display control means in accordance with a selection of a user,
    wherein said display means displays an image indicating a shape of the paper that conforms to an orientation of print data, and displays the selected one of the selectable binding positions, at which the printing device can bind papers, in a manner distinguishable from other selectable binding positions.

3. The apparatus according to claim 2, wherein said display control means further displays a designated binding orientation on the image indicating the shape of the paper.

4. A printing control apparatus according to claim 1, wherein the function for binding the paper is a stapling function.

5. A printing control apparatus according to claim 1, wherein the function for binding the paper is a punching function.

6. A printing control apparatus according to claim 1, wherein said printing control apparatus is a host computer which communicates with said printing device, and wherein said host computer executes software to realize said printing control apparatus.

7. A printing control apparatus for controlling a printing device having a function for binding paper output by the printing device, comprising:

printing condition setting means for setting a printing condition;

display control means for displaying selectable binding positions at which the printing device can bind papers;

change means for changing displaying of selectable binding positions in accordance with the printing condition set by said printing condition setting means;

selecting means for selecting one of the selectable binding positions displayed by said display control means in accordance with a selection of a user; and detection means for detecting whether the printing condition set by said setting means does not conform to the position selected by said selection means and outputting a warning when the printing condition does not conform to the selected position, wherein said display means displays an image indicating a shape of the paper that conforms to an orientation of print data, and displays the selected one of the selectable binding positions, at which the printing device can bind papers, in a manner distinguishable from other selectable binding positions.

8. A printing control apparatus for controlling a printing device having a function for binding paper output by the printing device, comprising:

size setting means for setting a paper size;

display means for displaying selectable binding positions, which selectable binding positions vary depending upon the paper size set by said size setting means;

selecting means for selecting one of the selectable binding positions displayed by said display means in accordance with a selection of a user; and incompatibility detecting means for detecting incompatibility between a set paper size and a position selected by said selecting means, and issuing a warning when incompatibility is detected.

9. A printing control apparatus for controlling a printing device having a function for binding paper output by the printing device, comprising:

size setting means for setting a paper size;

display means for displaying selectable binding positions, which selectable binding positions vary depending upon the paper size set by said size setting means;

selecting means for selecting one of the selectable binding positions displayed by said display means in accordance with a selection of a user; and warning means for detecting that a number of pages to be bound has exceeded a number of pages the printer is capable of binding, and issuing a warning when this number of pages is detected.

10. A printing control apparatus for controlling a printing device having a function for binding paper output by the printing device, comprising:

size setting means for setting paper size;

display means for displaying selectable binding positions which depend upon the paper size set by said size setting means;

selecting means for selecting one of the positions according to a selection by a user; and control means for controlling formation of an image to be printed in an upside down direction in a case where a position selected by said selecting means is located at an edge opposite an edge at which binding is performed by the printing device.

11. A printing control method for controlling a printing device having a function for binding paper output by the printing device, comprising:

a paper condition input step of inputting a paper condition; and a display control step of displaying on a screen a plurality of selectable binding positions at which the printing device can bind papers, wherein said display control step controls displaying of the selectable binding positions in accordance with the paper condition input in said paper condition input step, and wherein the paper condition includes a size of the paper.

12. The method according to claim 11, further comprising a selecting step for selecting one of the selectable binding positions displayed in said display control step in accordance with a selection of a user, wherein said display step displays an image indicating a shape of the paper that conforms to an orientation of print data, and displays the selected one of the selectable binding positions, at which the printing device can bind papers, in a manner distinguishable from other selectable binding positions.

13. The method according to claim 12, wherein said display control step further displays a designated binding orientation on the image indicating the shape of the paper.

14. A printing control method according to claim 11, wherein the function for binding the paper is a stapling function.

15. A printing control method according to claim 11, wherein said printing control method is performed by a host computer which communicates with the printing device, and wherein the host computer executes software to perform said printing control method.

16. The method according to claim 11, wherein the function for binding the paper is a punching function.

17. A printing control method for controlling a printing device having a function for binding paper output by the printing device, comprising:

a printing condition setting step of setting a printing condition;

a display control step of displaying selectable binding positions at which the printing device can bind papers;

a changing step of changing displaying of selectable binding positions in accordance with the printing condition set in said printing condition setting step;

a selecting step for selecting one of the selectable binding positions displayed in said display control step in accordance with a selection of a user; and a detection step for detecting whether the printing condition set in said setting step does not conform to the selected position selected in said selecting step and outputting a warning when the printing condition does not conform to the selected position, wherein said display step displays an image indicating a shape of the paper that conforms to an orientation of print data, and displays the selected one of the selectable binding positions, at which the printing device can bind papers, in a manner distinguishable from other selectable binding positions.

18. A printing control method for controlling a printing device having a function for binding paper output by the printing device, comprising:

a size setting step of setting a paper size;

a display step of displaying selectable binding positions, which selectable binding positions vary depending upon the paper size set in said size setting step;

a selecting step of selecting one of the selectable binding positions displayed in said display step in accordance with a selection of a user; and an incompatibility detecting step of detecting incompatibility between a set paper size and the position selected in said selecting step, and issuing a warning when incompatibility is detected.

19. A printing control method for controlling a printing device having a function for binding paper output by the printing device, comprising:

a size setting step of setting a paper size;

a display step of displaying selectable binding positions, which selectable binding positions vary depending upon the paper size set in said size setting step;

a selecting step of selecting one of the selectable binding positions displayed in said display step in accordance with a selection of a user; and a warning step of detecting that a number of pages to be bound has exceeded a number of pages the printing device is capable of binding, and issuing a warning when this number of pages is detected.

20. A printing control method for controlling a printing device having a function for binding paper output by the printing device, comprising:

a size setting step for setting paper size;

a display step for displaying selectable binding positions which depend upon the paper size set in said size setting step;

a selecting step for selecting one of the positions according to a selection by a user; and a control step of controlling formation of an image to be printed in an upside down direction in a case where a position selected in said selecting step is located at an edge opposite an edge at which binding is performed by the printing device.

21. A computer readable storage medium storing a computer program in accordance with which printing is performed by a printing device having a function for binding paper output by the printing device, said program comprising:

paper condition input processing code for inputting a paper condition; and display control processing code for displaying on a screen a plurality of selectable binding positions at which the printing device can bind papers, wherein displaying of the selectable binding positions is controlled by said display control processing code in accordance with the paper condition input by said paper condition input processing code, and wherein the paper condition includes a size of the paper.

22. The storage medium according to claim 21, further comprising selection processing code for selecting one of the selectable binding positions displayed by said display control processing code in accordance with a selection of a user, wherein said display processing code includes processing for displaying an image indicating a shape of the paper that conforms to an orientation of print data, and for displaying the selected one of the selectable binding positions, at which the printing device can bind papers, in a manner distinguishable from other selectable binding positions.

23. The storage medium according to claim 22, wherein said display processing code includes processing for displaying a designated binding orientation on the image indicating the shape of the paper.

24. A printing control method according to claim 21, wherein the function for binding the paper is a stapling function.

25. A storage medium according to claim 21, wherein said storage medium is resident in a host computer which communicates with the printing device, and wherein the host computer executes the computer program.

26. The storage medium according to claim 21, wherein the function for binding the paper is a punching function.

27. A computer readable storage medium storing a computer program in accordance with which printing is performed by a printing device having a function for binding paper output by the printing device, said program comprising:

printing condition setting processing code for setting a printing condition;

display control processing code for displaying selectable binding positions at which the printing device can bind papers;

change processing code for changing displaying of selectable binding positions in accordance with the printing condition changed by said printing condition setting processing code;

selection processing code for selecting one of the selectable binding positions displayed by said display control processing code in accordance with a selection of a user; and detection processing code for detecting whether the printing condition set by said setting processing code does not conform to the selected position selected by said selection processing code and warning output processing code for outputting a warning when the printing condition does not conform to the selected position, wherein said display processing code includes processing for displaying an image indicating a shape of the paper that conforms to an orientation of print data, and for displaying the selected one of the selectable binding positions, at which the printing device can bind papers, in a manner distinguishable from other selectable binding positions.

28. A computer readable storage medium storing a computer program in accordance with which printing is performed by a printing device having a function for binding paper output by the printing device, said program comprising:

size setting processing code for setting a paper size;

display processing code for displaying selectable binding positions, which selectable binding positions vary depending upon the paper size set by executing said size setting processing code;

selecting processing code for selecting one of the selectable binding positions in accordance with a selection of a user; and incompatibility detection processing code for detecting incompatibility between a set paper size and a position selected by said selecting processing code, and issuing a warning when incompatibility is detected.

29. A computer readable storage medium storing a computer program in accordance with which printing is performed by a printing device having a function for binding paper output by the printing device, said program comprising:

size setting processing code for setting a paper size;

display processing code for displaying selectable binding positions, which selectable binding positions vary depending upon the paper size set by executing said size setting processing code;

selecting processing code for selecting one of the selectable binding positions in accordance with a selection of a user; and warning processing code for detecting that a number of pages to be bound has exceeded a number of pages the printing device is capable of binding, and issuing a warning when this number of pages is detected.

30. Computer readable storage medium storing a computer program in accordance with which printing is performed by a printing device having a function for binding paper output by the printing device, comprising:

size setting processing code for setting paper size;

display processing code for displaying selectable binding positions which depend upon the paper size set by said size setting processing code;

selecting processing code for selecting one of the positions according to a selection by a user; and control processing code for controlling formation of an image to be printed in an upside down direction in a case where a position selected by said selecting processing code is located at an edge opposite an edge at which binding is performed by the printing device.

31. A control apparatus for controlling a printing device having a function for binding papers output by the printing device, comprising:

input means for inputting an instruction relating to binding papers; and display control means for controlling a display device so as to display selectable binding positions distinguishable from un-selected binding positions, wherein the selectable and un-selectable binding positions vary in accordance with an input instruction other than the instruction relating to binding papers.

32. The apparatus according to claim 31, wherein the input instruction relating to binding papers is an instruction instructing binding positions.

33. The apparatus according to claim 31, wherein the input instruction other than the instruction relating to binding papers is an instruction instructing paper condition.

34. The apparatus according to claim 33, wherein the paper condition includes at least one of a size of paper and a direction of paper.

35. The control apparatus according to claim 31, wherein said control apparatus is a host computer which communicates with said printing device, and wherein said host computer executes a program to realize said control apparatus.

36. A control method for controlling a printing device having a function for binding papers output by the printing device, comprising steps of:

inputting an instruction relating to binding papers; and controlling a display so as to display selectable binding positions distinguishable from un-selectable binding positions, wherein the selectable and un-selectable binding positions vary in accordance with an input instruction other than the instruction relating to binding papers.

37. The method according to claim 36, wherein the input instruction relating to binding papers is an instruction instructing binding positions.

38. The method according to claim 36, wherein the input instruction relating to binding papers is an instruction instructing paper condition.

39. The method according to claim 38, wherein the paper condition includes at least one of a size of paper and a direction of paper.

40. The control method according to claim 36, wherein said control method is performed by a host computer which communicates with the printing device, and wherein the host computer executes a program to realize said control method.

41. A storage medium storing a computer program for controlling a printing device having a function for binding papers output by the printing device, the computer program comprising processing steps of:

inputting an instruction relating to binding papers; and controlling a display so as to display selectable binding positions distinguishable from un-selected binding positions, wherein the selectable and unselectable binding positions vary in accordance with an input instruction other than the instruction relating to binding papers.

42. The storage medium according to claim 41, wherein the input instruction relating to binding papers is an instruction instructing binding positions.

43. The storage medium according to claim 41, wherein the input instruction other than the instruction relating to binding papers is an instruction instructing paper condition.

44. The storage medium according to claim 43, wherein the paper condition includes at least one of a size of paper and a direction of paper.

45. The storage medium according to claim 41, wherein said storage medium is resident in a host computer which communicates with the printing device, and wherein the host computer executes the computer program.

46. A computer program product for controlling a printing device having a function for binding paper output by the printing device, said computer program product comprising software code portions to be executed by a computer for performing the steps of:

inputting a paper condition; and displaying on a screen a plurality of selectable binding positions at which the printing device can bind papers, wherein said displaying step controls displaying of the selectable binding positions in accordance with the paper condition input in said inputting step, and wherein the paper condition includes a size of the paper.

47. A computer program product according to claim 46, further comprising the step of selecting one of the selectable binding positions displayed in said displaying step in accordance with a selection of a user, wherein said displaying step displays an image indicating a shape of the paper that conforms to an orientation of print data, and displays the selected binding position, at which the printing device can bind papers, in a manner distinguishable from other selectable binding positions.

48. A computer program product according to claim 47, wherein said displaying step further displays a designated binding orientation on the image indicating the shape of the paper.

49. A computer program product according to claim 46, wherein the function for binding the paper is a stapling function.

50. A computer program product according to claim 46, wherein said program product is stored in a host computer which communicates with the printing device, and wherein the host computer executes said computer program.

51. The computer program product according to claim 46, wherein the function for binding the paper is a punching function.

52. A computer program product for controlling a printing device having a function for binding paper output by the printing device, said computer program product comprising software code portions to be executed by a computer for performing the steps of:

setting a printing condition;

displaying selectable binding positions, at which the printing device can bind papers;

changing displaying of selectable binding positions in accordance with the printing condition set in said setting step;

selecting one of the selectable binding positions displayed in said displaying step in accordance with a selection of a user; and detecting whether the printing condition set in said setting step does not conform to the position selected in said selecting step, and outputting a warning when the printing condition does not conform to the selected position, wherein said displaying step displays an image indicating a shape of the paper that conforms to an orientation of print data, and displays the selected binding position, at which the printing device can bind papers, in a manner distinguishable from other selectable binding positions.

53. A computer program product for controlling a printing device having a function for binding paper output by the printing device, said computer program product comprising software code portions to be executed by a computer for performing the steps of:

setting a paper size;

displaying selectable binding positions, which binding positions vary depending upon the paper size set in said setting step;

selecting one of the selectable binding positions displayed in said displaying step in accordance with a selection by a user;

detecting incompatibility between a set paper size and a binding position selected in said selecting step; and issuing a warning when incompatibility is detected.

54. A computer program product for controlling a printing device having a function for binding paper output by the printing device, said computer program product comprising software code portions to be executed by a computer for performing the steps of:

setting a paper size;

displaying selectable binding positions, which binding positions vary depending upon the paper size set in said setting step;

selecting one of the selectable binding positions displayed in said displaying step in accordance with a selection by a user;

detecting that a number of pages to be bound has exceeded a number of pages the printing device is capable of binding; and issuing a warning when this number of pages is detected.

55. A computer program product for controlling a printing device having a function for binding paper output by the printing device, said computer program product comprising software code portions to be executed by a computer for performing the steps of:

setting a paper size;

displaying selectable binding positions which depend on the paper size set in said setting step;

selecting one of the positions according to a selection by a user; and controlling an image to be printed in an upside down direction in a case where a binding position selected in said selecting step is located at an edge opposite an edge at which binding is performed by the printing device.

56. A computer connected via a communication channel with a printing device having a function for binding paper, comprising:

paper size setting means for setting a paper size;

display control means for displaying selectable binding positions, and communication means for communicating with the printing device via the communication channel, wherein said display control means controls a display of the selectable binding position in accordance with the paper size set by said paper size setting means, and wherein said communication means transmits information to the printing device via the communication channel indicating a binding position selected by a user from the selectable binding positions displayed by said display control means in accordance with the paper size set by said paper size setting means.

57. A printing control method for controlling via a communication channel a printing device having a function for binding paper, said method comprising the steps of:

setting a paper size;

displaying selectable binding positions, and communicating with the printing device via the communication channel, wherein said displaying step controls a display of the selectable binding position in accordance with the paper size set in said paper size setting step, and wherein, in said communicating step, information is transmitted to the printing device via the communication channel indicating a binding position selected by a user from the selectable binding positions displayed in said displaying step in accordance with the paper size set in said setting step.

58. A computer readable storage medium storing a computer program for controlling via a communication channel a printing device having a function for binding paper, said program comprising the steps of:

setting a paper size;

displaying selectable binding positions, and communicating with the printing device via the communication channel, wherein said displaying step controls a display of the selectable binding position in accordance with the paper size set in said paper size setting step, and wherein, in said communicating step, information is transmitted to the printing device via the communication channel indicating a binding position selected by a user from the selectable binding positions displayed in said displaying step in accordance with the paper size set in said setting step.

59. A computer executable program product for controlling via a communication channel a printing device having a function for binding paper, said program product comprising the steps of:

setting a paper size;

displaying selectable binding positions, and communicating with the printing device via the communication channel, wherein said displaying step controls a display of the selectable binding position in accordance with the paper size set in said paper size setting step, and wherein, in said communicating step, information is transmitted to the printing device via the communication channel indicating a binding position selected by a user from the selectable binding positions displayed in said displaying step in accordance with the paper size set in said setting step.

60. A computer program product for controlling a printing device having a function for binding papers output by the printing device, said computer program product comprising software code portions to be executed by a computer for performing the steps of:

inputting an instruction relating to binding papers; and controlling a display device so as to display selectable binding positions distinguishable from un-selectable binding positions, wherein the selectable binding positions vary in accordance with an input instruction other than the instruction relating to binding papers.

61. The computer program product according to claim 60, wherein the input instruction relating to binding papers is an instruction instructing binding positions.

62. The computer program product according to claim 60, wherein the input instruction other than the instruction relating to binding papers is an instruction instructing paper condition.

63. The computer program product according to claim 62, wherein the paper condition includes at least one of a size of paper and a direction of paper.

64. The computer program product according to claim 60, wherein said computer program product is stored in a host computer which communicates with the printing device, and wherein the host computer executes said computer program.

65. A printing control apparatus for controlling a printing device having a function for binding papers output by the printing device, comprising:

an input unit arranged to input a paper condition; and a display controller arranged to display on a screen a plurality of selectable binding positions at which the printing device can bind papers, wherein said display controller controls a display of the selectable binding positions in accordance with the paper condition input by said input unit, and wherein the paper condition includes a size of the paper.

66. A control apparatus for controlling a printing device having a function for binding papers output by the printing device, comprising:

an input unit arranged to input an instruction relating to binding papers; and a display controller arranged to control a display device so as to display selectable binding positions distinguishable from un-selected biding positions, wherein the selectable and un-selectable binding positions vary in accordance with input instructions other than the instruction relating to binding papers, wherein the paper condition includes a size of the paper.

67. A computer connected via a communication channel with a printing device having a function for binding paper, comprising;

a setting unit arranged to set a paper size;

a display controller arranged to display selectable binding positions; and a communication unit arranged to communicate with the printing device via the communication channel;

wherein said display controller controls a display of the selectable binding position in accordance with the paper size set by said setting unit, and wherein said communication unit transmits information to the printing device via the communication channel indicating a binding position selected by a user from the selectable binding positions displayed by said display controller in accordance with the paper size set by said setting unit.

* * * * *

UNITED STATES PATENT AND TRADEMARK OFFICE
CERTIFICATE OF CORRECTION

PATENT NO. : 6,406,199 B1
DATED : June 18, 2002
INVENTOR(S) : Eiji Hayashi

It is certified that error appears in the above-identified patent and that said Letters Patent is hereby corrected as shown below:

Column 3,
Line 28, "I" should read -- Is --.

Column 7,
Line 50, "been" (1ˢᵗ occurrence) should be deleted.

Column 9,
Line 17, "at" (2ⁿᵈ occurrence) should read -- as --.
Line 25, "will" should read -- will be --.
Line 53, "such" should read -- such a --.

Column 10,
Line 35, "crated" should read -- created --.

Column 12,
Line 6, "stapling" should read -- a stapling --, and "designated" should read
-- designate --.

Column 20,
Line 27, "un-selected" should read -- unselected --.

Column 24,
Line 28, "comprising;" should read -- comprising: --.

Signed and Sealed this

Twenty-sixth Day of November, 2002

Attest:

*Attesting Officer*

JAMES E. ROGAN
*Director of the United States Patent and Trademark Office*